(12) United States Patent
Hendry et al.

(10) Patent No.: US 10,917,564 B2
(45) Date of Patent: Feb. 9, 2021

(54) SYSTEMS AND METHODS OF GENERATING AND PROCESSING FILES FOR PARTIAL DECODING AND MOST INTERESTED REGIONS

(71) Applicant: QUALCOMM Incorporated, San Diego, CA (US)

(72) Inventors: Fnu Hendry, San Diego, CA (US); Ye-Kui Wang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 20 days.

(21) Appl. No.: 15/718,581

(22) Filed: Sep. 28, 2017

(65) Prior Publication Data
US 2018/0103199 A1 Apr. 12, 2018

Related U.S. Application Data

(60) Provisional application No. 62/407,502, filed on Oct. 12, 2016.

(51) Int. Cl.
*H04N 7/12* (2006.01)
*H04N 5/232* (2006.01)
(Continued)

(52) U.S. Cl.
CPC ....... *H04N 5/23238* (2013.01); *H04N 19/103* (2014.11); *H04N 19/162* (2014.11);
(Continued)

(58) Field of Classification Search
CPC ............. H04N 5/23238; H04N 19/172; H04N 19/103; H04N 19/33; H04N 19/162;
(Continued)

(56) References Cited

U.S. PATENT DOCUMENTS

2015/0016504 A1 1/2015 Auyeung et al.
2017/0127008 A1* 5/2017 Kankaanpaa ...... G06K 9/00711
(Continued)

FOREIGN PATENT DOCUMENTS

GB 2524531 A 9/2015

OTHER PUBLICATIONS

International Search Report and Written Opinion—PCT/US2017/055944—ISA/EPO—dated Dec. 20, 2017.
(Continued)

*Primary Examiner* — Richard T Torrente
(74) *Attorney, Agent, or Firm* — Polsinelli LLP

(57) ABSTRACT

Techniques and systems are provided for processing video data. For example, 360-degree video data can be obtained for processing by an encoding device or a decoding device. The 360-degree video data includes pictures divided into motion-constrained tiles. The 360-degree video data can be used to generate a media file including several tracks. Each of the tracks contain a set of at least one of the motion-constrained tiles. The set of at least one of the motion-constrained tiles corresponds to at least one of several viewports of the 360-degree video data. A first tile representation can be generated for the media file. The first tile representation encapsulates a first track among the several tracks, and the first track includes a first set of at least one of the motion-constrained tiles at a first tile location in the pictures of the 360-degree video data. The first set of at least one of the motion-constrained tiles corresponds to a viewport of the 360-degree video data.

55 Claims, 25 Drawing Sheets

(51) Int. Cl.

| | |
|---|---|
| *H04N 21/218* | (2011.01) |
| *H04N 21/2662* | (2011.01) |
| *H04N 21/81* | (2011.01) |
| *H04N 21/2343* | (2011.01) |
| *H04N 21/84* | (2011.01) |
| *H04N 19/61* | (2014.01) |
| *H04N 21/4402* | (2011.01) |
| *H04N 19/33* | (2014.01) |
| *H04N 21/8543* | (2011.01) |
| *H04N 19/70* | (2014.01) |
| *H04N 19/162* | (2014.01) |
| *H04N 21/845* | (2011.01) |
| *H04N 19/172* | (2014.01) |
| *H04N 19/103* | (2014.01) |
| *H04L 29/08* | (2006.01) |

(52) U.S. Cl.
CPC ............ *H04N 19/172* (2014.11); *H04N 19/33* (2014.11); *H04N 19/61* (2014.11); *H04N 19/70* (2014.11); *H04N 21/21805* (2013.01); *H04N 21/2343* (2013.01); *H04N 21/23439* (2013.01); *H04N 21/234318* (2013.01); *H04N 21/234327* (2013.01); *H04N 21/2662* (2013.01); *H04N 21/440227* (2013.01); *H04N 21/440245* (2013.01); *H04N 21/816* (2013.01); *H04N 21/84* (2013.01); *H04N 21/845* (2013.01); *H04N 21/8543* (2013.01); *H04L 67/02* (2013.01)

(58) Field of Classification Search
CPC ....... H04N 21/2343; H04N 21/234318; H04N 19/70; H04N 21/8543; H04N 21/845; H04N 21/440245; H04N 21/440227; H04N 21/234327; H04N 21/816; H04N 19/61; H04N 21/2662; H04N 21/21805; H04N 21/23439; H04N 21/84; H04L 67/02
USPC .................................................... 375/240.26
See application file for complete search history.

(56) References Cited

U.S. PATENT DOCUMENTS

2017/0223083 A1* 8/2017 Maze ............. H04N 21/234327
2017/0347026 A1* 11/2017 Hannuksela ........... H04N 19/00

OTHER PUBLICATIONS

Kurutepe E., et al., "Client-Driven Selective Streaming of Multiview Video for Interactive 3DTV," IEEE Transactions on Circuits and Systems for Video Technology, IEEE Service Center, Piscataway, NJ, US, vol. 17, No. 11, Nov. 1, 2007 (Nov. 1, 2007), pp. 1558-1565, XP011195137, ISSN: 1051-8215, DOI: 10.1109/TCSVT.2007.903664.

* cited by examiner

| SupplementalProperty@ value parameter | Use | Description |
|---|---|---|
| tile_source_id | M | A whitespace-separated list of non-negative integer in decimal representation providing the representation IDs of the representation for the source of the content |

Legend:
   M=Mandatory, O=Optional

FIG. 16

| SupplementalProperty@ value parameter | Use | Description |
|---|---|---|
| tile_hor_offset | M | non-negative integer indicating the horizontal coordinate, in luma samples, of the upper left corner of the tile relative to the top left corner of the complete VR picture. |
| tile_ver_offset | M | non-negative integer indicating the vertical coordinate, in luma samples, of the upper left corner of the tile relative to the top left corner of the complete VR picture. |

Legend:
M=Mandatory, O=Optional

FIG. 17

```
<?xml version="1.0" encoding="UTF-8"?>
<MPD
    xmlns="urn:mpeg:dash:schema:mpd:2011"
    type="static"
    mediaPresentationDuration="PT10S"
    minBufferTime="PT1S"
    profiles="urn:mpeg:dash:profile:isoff-on-demand:2011">

<Period>
        <AdaptationSet segmentAlignment="true" subsegmentAlignment="true" subsegmentStartsWithSAP="1">
            <Representation id="1" mimeType="video/mp4" codecs="shvc.1.6.L156.0" width="1920" height="960" frameRate="60" sar="1:1" startWithSAP="1" bandwidth="1576813">
                <EssentialProperty schemeIdUri="urn:mpeg:dash:360video:2017" value=" "/>
                <BaseURL>baselayer_1920x960.mp4</BaseURL>
                ...
            </Representation>
            <Representation id="2" mimeType="video/mp4" dependencyId="1" codecs="hvc1.1.6.L156.0" width="3840" height="1920" frameRate="60" sar="1:1" startWithSAP="1" bandwidth="8194888">
                <EssentialProperty schemeIdUri="urn:mpeg:dash:360video:2017" value=" "/>
                <SupplementalProperty schemeIdUri="urn:mpeg:dash:tilebaserep:2017" value="3 4 5 6 7 8 9 10 11 12 13 14"/>
            </Representation>
            <Representation id="3" mimeType="video/mp4" dependencyId="1" codecs="hvc1.1.6.L156.0" width="960" height="640" frameRate="60" sar="1:1" startWithSAP="1" bandwidth="776119">
                <EssentialProperty schemeIdUri="urn:mpeg:dash:360video:2017" value=" "/>
                <SupplementalProperty schemeIdUri="urn:mpeg:dash:tilerep:2017" value="0,0"/>
                <BaseURL>enhc_layer_tile1_960x640.mp4</BaseURL>
                ...
            </Representation>
            <Representation id="4" mimeType="video/mp4" dependencyId="1" codecs="hvc1.1.6.L156.0" width="960" height="640" frameRate="60" sar="1:1" startWithSAP="1" bandwidth="518288">
                <EssentialProperty schemeIdUri="urn:mpeg:dash:360video:2017" value=" "/>
                <SupplementalProperty schemeIdUri="urn:mpeg:dash:tilerep:2017" value="960,0"/>
                <BaseURL>enhc_layer_tile2_960x640.mp4</BaseURL>
                ...
            </Representation>
            <Representation id="5" mimeType="video/mp4" dependencyId="1" codecs="hvc1.1.6.L156.0" width="960" height="640" frameRate="60" sar="1:1" startWithSAP="1" bandwidth="639428">
                <EssentialProperty schemeIdUri="urn:mpeg:dash:360video:2017" value=" "/>
                <SupplementalProperty schemeIdUri="urn:mpeg:dash:tilerep:2017" value="1920,0"/>
                <BaseURL>enhc_layer_tile3_960x640.mp4</BaseURL>
                ...
            </Representation>
            ...
            <Representation id="14" mimeType="video/mp4" dependencyId="1" codecs="hvc1.1.6.L156.0" width="960" height="640" frameRate="60" sar="1:1" startWithSAP="1" bandwidth="543876">
                <EssentialProperty schemeIdUri="urn:mpeg:dash:360video:2017" value=" "/>
                <SupplementalProperty schemeIdUri="urn:mpeg:dash:tilerep:2017" value="2880,1280"/>
                <BaseURL>enhc_layer_tile12_960x640.mp4</BaseURL>
                ...
            </Representation>
        </AdaptationSet>
    </Period>
</MPD>
```

FIG. 18

| SupplementalProperty@value parameter | Use | Description |
|---|---|---|
| source_id | M | non-negative integer in decimal representation providing the identifier of the representation containing the most interested region. |
| mir_hor_offset | M | non-negative integer indicating the horizontal coordinate, in luma samples, of the upper left corner of the most interested region relative to the top left corner of the complete VR picture. |
| mir_ver_offset | M | non-negative integer indicating the vertical coordinate, in luma samples, of the upper left corner of the most interested region relative to the top left corner of the complete VR picture. |
| mir_width | M | non-negative integer indicating the width of the most interested region. |
| mir_height | M | non-negative integer indicating the height of the most interested region. |

Legend:
M=Mandatory, O=Optional

```xml
<?xml version="1.0" encoding="UTF-8"?>
<MPD
  xmlns="urn:mpeg:dash:schema:mpd:2011"
  type="static"
  mediaPresentationDuration="PT10S"
  minBufferTime="PT1S"
  profiles="urn:mpeg:dash:profile:isoff-on-demand:2011">

<Period duration="PT0H1M0.000S">                                    ← 2002
    <AdaptationSet segmentAlignment="true" subsegmentAlignment="true"
subsegmentStartsWithSAP="1">
      <Representation id="1" mimeType="video/mp4" codecs="shv1.1.6.L156.0" width="1920"
height="960" frameRate="60" sar="1:1" startWithSAP="1" bandwidth="1576813">
        <EssentialProperty schemeIdUri="urn:mpeg:dash:360video:2017" value=".."/>
        <BaseURL>baselayer_1920x960.mp4</BaseURL>
        ...
      </Representation>
      <Representation id="2" mimeType="video/mp4" dependencyId="1" codecs="hvc1.1.6.L156.0"
width="3840" height="1920" frameRate="60" sar="1:1" startWithSAP="1" bandwidth="6156858">    ← 2006
        <EssentialProperty schemeIdUri="urn:mpeg:dash:360video:2017" value=".."/>
        <SupplementalProperty schemeIdUri="urn:mpeg:dash:tilebaserep:2017" value="3 4 5 6 7 8
9 10 11 12 13 14"/>
        <SupplementalProperty schemeIdUri="urn:mpeg:dash:mir:2017" value="3,100,100,300,
300"/>                                                                ← 2008
      </Representation>
      <Representation id="3" mimeType="video/mp4" dependencyId="1" codecs="hvc1.1.6.L156.0"
width="960" height="640" frameRate="60" sar="1:1" startWithSAP="1" bandwidth="776113">
        <EssentialProperty schemeIdUri="urn:mpeg:dash:360video:2017" value=".."/>
        <SupplementalProperty schemeIdUri="urn:mpeg:dash:tilerep:2017" value="0,0"/>
        <BaseURL>enhc_layer_tile1_960x640.mp4</BaseURL>
        ...
      </Representation>
      <Representation id="4" mimeType="video/mp4" dependencyId="1" codecs="hvc1.1.6.L156.0"
width="960" height="640" frameRate="60" sar="1:1" startWithSAP="1" bandwidth="618288">
        <EssentialProperty schemeIdUri="urn:mpeg:dash:360video:2017" value=".."/>
        <SupplementalProperty schemeIdUri="urn:mpeg:dash:tilerep:2017" value="960,0"/>
        <BaseURL>enhc_layer_tile2_960x640.mp4</BaseURL>
        ...
      </Representation>
      <Representation id="5" mimeType="video/mp4" dependencyId="1" codecs="hvc1.1.6.L156.0"
width="960" height="640" frameRate="60" sar="1:1" startWithSAP="1" bandwidth="639428">
        <EssentialProperty schemeIdUri="urn:mpeg:dash:360video:2017" value=".."/>
        <SupplementalProperty schemeIdUri="urn:mpeg:dash:tilerep:2017" value="1920,0"/>
        <BaseURL>enhc_layer_tile3_960x640.mp4</BaseURL>
        ...
      </Representation>
      <Representation id="6" mimeType="video/mp4" dependencyId="1" codecs="hvc1.1.6.L156.0"
width="960" height="640" frameRate="60" sar="1:1" startWithSAP="1" bandwidth="639428">
        <EssentialProperty schemeIdUri="urn:mpeg:dash:360video:2017" value=".."/>
        <SupplementalProperty schemeIdUri="urn:mpeg:dash:tilerep:2017" value="2880,0"/>
        <BaseURL>enhc_layer2_tile4_960x640.mp4</BaseURL>
        ...
      </Representation>
      ...
    </AdaptationSet>
  </Period>
```

OBTAIN 360-DEGREE VIDEO DATA, THE 360-DEGREE VIDEO DATA INCLUDING A PLURALITY OF PICTURES DIVIDED INTO A PLURALITY OF MOTION-CONSTRAINED TILES
2102

↓

GENERATE, USING THE 360-DEGREE VIDEO DATA, A MEDIA FILE INCLUDING A PLURALITY OF TRACKS, EACH OF THE PLURALITY OF TRACKS CONTAINING A SET OF AT LEAST ONE OF THE PLURALITY OF MOTION-CONSTRAINED TILES, WHEREIN THE SET OF AT LEAST ONE OF THE PLURALITY OF MOTION-CONSTRAINED TILES CORRESPONDS TO AT LEAST ONE OF A PLURALITY OF VIEWPORTS OF THE 360-DEGREE VIDEO DATA
2104

↓

GENERATE A FIRST TILE REPRESENTATION FOR THE MEDIA FILE, WHEREIN THE FIRST TILE REPRESENTATION ENCAPSULATES A FIRST TRACK OF THE PLURALITY OF TRACKS, THE FIRST TRACK INCLUDING A FIRST SET OF AT LEAST ONE OF THE PLURALITY OF MOTION-CONSTRAINED TILES AT A FIRST TILE LOCATION IN THE PLURALITY OF PICTURES, WHEREIN THE FIRST SET OF AT LEAST ONE OF THE PLURALITY OF MOTION-CONSTRAINED TILES CORRESPONDS TO A VIEWPORT OF THE 360-DEGREE VIDEO DATA
2106

OBTAIN A MEDIA FILE INCLUDING A PLURALITY OF TRACKS, EACH OF THE PLURALITY OF TRACKS CONTAINING A SET OF AT LEAST ONE OF A PLURALITY OF MOTION-CONSTRAINED TILES OF A PLURALITY OF PICTURES REPRESENTING 360-DEGREE VIDEO DATA, WHEREIN THE SET OF AT LEAST ONE OF THE PLURALITY OF MOTION-CONSTRAINED TILES CORRESPONDS TO AT LEAST ONE OF A PLURALITY OF VIEWPORTS OF THE 360-DEGREE VIDEO DATA
2202

PROCESS THE MEDIA FILE, THE MEDIA FILE INCLUDING A FIRST TILE REPRESENTATION FOR THE MEDIA FILE, WHEREIN THE FIRST TILE REPRESENTATION ENCAPSULATES A FIRST TRACK OF THE PLURALITY OF TRACKS, THE FIRST TRACK INCLUDING A FIRST SET OF AT LEAST ONE OF THE PLURALITY OF MOTION-CONSTRAINED TILES AT A FIRST TILE LOCATION IN THE PLURALITY OF PICTURES, WHEREIN THE FIRST SET OF AT LEAST ONE OF THE PLURALITY OF MOTION-CONSTRAINED TILES CORRESPONDS TO A VIEWPORT OF THE 360-DEGREE VIDEO DATA
2204

FIG. 22

SYSTEMS AND METHODS OF GENERATING AND PROCESSING FILES FOR PARTIAL DECODING AND MOST INTERESTED REGIONS

CROSS-REFERENCE TO RELATED APPLICATIONS

This application claims the benefit of U.S. Provisional Application No. 62/407,502, filed Oct. 12, 2016, which is hereby incorporated by reference, in its entirety and for all purposes.

FIELD

This application is related to video coding and compression. More specifically, this application relates to systems and methods of generating and processing files for partial decoding and most interested regions.

BACKGROUND

Many devices and systems allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Various video coding techniques may be used to compress video data. Video coding is performed according to one or more video coding standards. For example, video coding standards include high-efficiency video coding (HEVC), advanced video coding (AVC), moving picture experts group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bitrate, while avoiding or minimizing degradations to video quality. With ever-evolving video services becoming available, encoding techniques with better coding efficiency are needed.

BRIEF SUMMARY

In some examples, techniques and systems are described herein for generating and processing media files for viewport dependent 360-degree video coded content and/or for most interested regions in video content. For example, viewport dependent video coded content can be encoded by dividing the pictures of a video stream into motion-constrained tiles. Only the tiles of the pictures that are required to display a current viewport (also referred to as a field of view) of a display device can be provided for display. Regions referred to as "most interested regions" can also be determined based on user statistics or can be user-defined. For instance, a most interested region in a 360-degree video picture can include one of the regions (e.g., covered by one or more tiles) that are statistically most likely to be rendered to the user at the presentation time of the picture. The most interested regions can be used for various purposes, such as for data pre-fetching in 360-degree video adaptive streaming, for transcoding optimization when a 360-degree video is transcoded, for cache management, for content management, among others.

Media files can be generated for signaling the viewport dependent 360-degree video coded content and/or the most interested regions in the video content. The media files can include any suitable streaming media file, such as a media presentation description (MPD) used for adaptive bitrate streaming media according to the Dynamic Adaptive Streaming over HyperText Transfer Protocol (HTTP) (known as DASH), or other suitable file according to any other suitable adaptive streaming protocol.

In some aspects, tile representations can be generated for inclusion in a media file. A tile representation can encapsulate a track carrying motion-constrained tiles at a tile location in a video picture. For example, the track encapsulated by the tile representation can include a group of tiles at a specific tile location in the pictures of a 360-degree video stream. In some cases, an adaptation set can also be generated for the media file, and can include various tile representations of the 360-degree video stream, where the tile representations correspond to different viewports. The tile representations in the adaptation set can include the motion-constrained tiles of one or more enhancement layers, and either the pictures of a base layer (when the base layer is not divided into tiles), or the motion-constrained tiles of the pictures of the base layer (when the base layer is divided into tiles). In some cases, a tile base representation can also be generated (e.g., for each of the different layers in the adaptation set) for inclusion in the media file. The tile base representation can encapsulate all motion-constrained tiles (e.g., the tile representations) of the pictures for a given layer. An element can be associated with a tile base representation with a value containing a list of all of the tile representations corresponding to the motion-constrained tiles encapsulated by the tile base representation.

According to at least one example, a method of processing video data is provided. The method comprises obtaining 360-degree video data. The 360-degree video data includes a plurality of pictures divided into a plurality of motion-constrained tiles. The method further comprises generating, using the 360-degree video data, a media file including a plurality of tracks. Each of the plurality of tracks contain a set of at least one of the plurality of motion-constrained tiles. The set of at least one of the plurality of motion-constrained tiles corresponds to at least one of a plurality of viewports of the 360-degree video data. The method further comprises generating a first tile representation for the media file. The first tile representation encapsulates a first track of the plurality of tracks. The first track includes a first set of at least one of the plurality of motion-constrained tiles at a first tile location in the plurality of pictures. The first set of at least one of the plurality of motion-constrained tiles corresponds to a viewport of the 360-degree video data.

In another example, an apparatus for processing video data is provided that includes a memory configured to store 360-degree video data and a processor. The processor is configured to and can obtain the 360-degree video data. The 360-degree video data includes a plurality of pictures divided into a plurality of motion-constrained tiles. The processor is further configured to and can generate, using the 360-degree video data, a media file including a plurality of tracks. Each of the plurality of tracks contain a set of at least one of the plurality of motion-constrained tiles. The set of at least one of the plurality of motion-constrained tiles corresponds to at least one of a plurality of viewports of the 360-degree video data. The processor is further configured to and can generate a first tile representation for the media file. The first tile representation encapsulates a first track of the plurality of tracks. The first track includes a first set of at least one of the plurality of motion-constrained tiles at a first tile location in the plurality of pictures. The first set of at least one of the plurality of motion-constrained tiles corresponds to a viewport of the 360-degree video data.

In another example, a non-transitory computer-readable medium is provided having stored thereon instructions that, when executed by one or more processors, cause the one or more processor to: obtain 360-degree video data, the 360-degree video data including a plurality of pictures divided into a plurality of motion-constrained tiles; generate, using the 360-degree video data, a media file including a plurality of tracks, each of the plurality of tracks containing a set of at least one of the plurality of motion-constrained tiles, wherein the set of at least one of the plurality of motion-constrained tiles corresponds to at least one of a plurality of viewports of the 360-degree video data; and generate a first tile representation for the media file, wherein the first tile representation encapsulates a first track of the plurality of tracks, the first track including a first set of at least one of the plurality of motion-constrained tiles at a first tile location in the plurality of pictures, wherein the first set of at least one of the plurality of motion-constrained tiles corresponds to a viewport of the 360-degree video data.

In another example, an apparatus for processing video data is provided. The apparatus includes means for obtaining 360-degree video data. The 360-degree video data includes a plurality of pictures divided into a plurality of motion-constrained tiles. The apparatus further includes means for generating, using the 360-degree video data, a media file including a plurality of tracks. Each of the plurality of tracks contain a set of at least one of the plurality of motion-constrained tiles. The set of at least one of the plurality of motion-constrained tiles corresponds to at least one of a plurality of viewports of the 360-degree video data. The apparatus further includes means for generating a first tile representation for the media file. The first tile representation encapsulates a first track of the plurality of tracks. The first track includes a first set of at least one of the plurality of motion-constrained tiles at a first tile location in the plurality of pictures. The first set of at least one of the plurality of motion-constrained tiles corresponds to a viewport of the 360-degree video data.

In some aspects, the first tile representation includes a Dynamic Adaptive Streaming over HTTP (DASH) representation. In some aspects, the media file includes a manifest file associated with an adaptive streaming format. For example, the media file can include a media presentation description (MPD).

In some aspects, the 360-degree video data includes a plurality of layers of pictures. The plurality of layers of pictures include at least one or more of different resolutions, different qualities, or different frame rates, or a combination thereof.

In some aspects, the method, apparatuses, and computer-readable medium described above may further comprise: generating an adaptation set for the media file, the adaptation set including a plurality of tile representations of the 360-degree video data corresponding to different viewports. In some cases, the plurality of tile representations correspond to the different viewports and to at least one or more of different resolutions, different qualities, or different frames rates, or a combination thereof.

In some aspects, the plurality of tile representations include the plurality of motion-constrained tiles, wherein the plurality of pictures divided into the plurality of motion-constrained tiles are part of at least one enhancement layer, and wherein the plurality of tile representations further include a plurality of pictures of a base layer. In some cases, the plurality of pictures of the base layer do not include motion-constrained tiles. In some cases, the plurality of pictures of the base layer include motion-constrained tiles.

In some aspects, the method, apparatuses, and computer-readable medium described above may further comprise: generating an adaptation set, the adaptation set including a set of tile representations corresponding to different viewports (and, in some cases, at least one or more of different resolutions, different qualities, or different frames rates, or a combination thereof); and generating, for at least one layer, a tile base representation, wherein the tile base representation encapsulates all motion-constrained tiles of pictures in the at least one layer. For example, a tile base representation can be generated for each layer of the bitstream. In some aspects, the tile base representation includes a DASH representation. In some examples, metadata applicable to the plurality of pictures of the 360-degree video data is defined for the tile base representation. The metadata includes information associated with at least one or more of a video projection type, one or more viewport directions, or region-wise mapping of the pictures, or a combination thereof.

In some aspects, a supplemental property element is defined for the tile base representation, the supplemental property element indicating that the tile base representation is a tile base representation. In some aspects, a value of the supplemental property element includes a list of representation identifiers identifying a plurality of tile representations of the tile base representation.

In some aspects, metadata is defined for the first tile representation. The metadata is applicable to a region in a picture of the 360-degree video data that is covered by a motion-constrained tile at the first tile location in the pictures of the 360-degree video data. The metadata includes information associated with at least one or more of a video projection type, one or more viewport directions, or region information of the first tile representation, or a combination thereof. The region information can include a most interested region, region-wise mapping, or other suitable picture region-based information.

In some aspects, a supplemental property element is defined for the first tile representation, the supplemental property element indicating that the first tile representation is a tile representation. In some aspects, a value of the supplemental property element includes one or more offsets describing a position of the motion-constrained tile in the picture. In some cases, the one or more offsets include a left offset and a top offset. For instance, the offsets can indicate the offset of the top-left most corner in a tile in the first tile representation from the top-left most corner in an entire picture.

In some aspects, the method, apparatuses, and computer-readable medium described above may further comprise generating a descriptor indicating one or more most interested regions in the 360-degree video data. In some aspects, the descriptor is generated on a tile base representation level. A tile base representation encapsulates all motion-constrained tiles of pictures in at least one layer. In some examples, the descriptor includes an identifier of a tile representation containing a most interested region in the 360-degree video data. In some examples, the descriptor includes one or more offsets indicating a location of the most interested region in a picture of the 360-degree video data. In some cases, the descriptor includes a width parameter indicating a width of the most interested region and a height parameter indicating a height of the most interested region.

According to at least one other example, a method of processing one or more media files is provided. The method comprises obtaining a media file including a plurality of tracks. Each of the plurality of tracks contains a set of at least one of a plurality of motion-constrained tiles of a plurality of pictures representing 360-degree video data. The set of at least one of the plurality of motion-constrained tiles corresponds to at least one of a plurality of viewports of the 360-degree video data. The method further comprises processing the media file. The media file includes a first tile representation for the media file. The first tile representation encapsulates a first track of the plurality of tracks. The first track includes a first set of at least one of the plurality of motion-constrained tiles at a first tile location in the plurality of pictures. The first set of at least one of the plurality of motion-constrained tiles corresponds to a viewport of the 360-degree video data.

In another example, an apparatus for processing one or more media files is provided that includes a memory configured to store one or more media files comprising 360-degree video data and a processor. The processor is configured to and can obtain a media file including a plurality of tracks. Each of the plurality of tracks contains a set of at least one of a plurality of motion-constrained tiles of a plurality of pictures representing 360-degree video data. The set of at least one of the plurality of motion-constrained tiles corresponds to at least one of a plurality of viewports of the 360-degree video data. The processor is further configured to and can process the media file. The media file includes a first tile representation for the media file. The first tile representation encapsulates a first track of the plurality of tracks. The first track includes a first set of at least one of the plurality of motion-constrained tiles at a first tile location in the plurality of pictures. The first set of at least one of the plurality of motion-constrained tiles corresponds to a viewport of the 360-degree video data.

In another example, a non-transitory computer-readable medium is provided having stored thereon instructions that, when executed by one or more processors, cause the one or more processor to: obtain a media file including a plurality of tracks, each of the plurality of tracks containing a set of at least one of a plurality of motion-constrained tiles of a plurality of pictures representing the 360-degree video data, wherein the set of at least one of the plurality of motion-constrained tiles corresponds to at least one of a plurality of viewports of the 360-degree video data; and process the media file, the media file including a first tile representation for the media file, wherein the first tile representation encapsulates a first track of the plurality of tracks, the first track including a first set of at least one of the plurality of motion-constrained tiles at a first tile location in the plurality of pictures, wherein the first set of at least one of the plurality of motion-constrained tiles corresponds to a viewport of the 360-degree video data.

In another example, an apparatus for processing one or more media files is provided. The apparatus includes means for obtaining a media file including a plurality of tracks. Each of the plurality of tracks contains a set of at least one of a plurality of motion-constrained tiles of a plurality of pictures representing 360-degree video data. The set of at least one of the plurality of motion-constrained tiles corresponds to at least one of a plurality of viewports of the 360-degree video data. The apparatus further includes means for processing the media file. The media file includes a first tile representation for the media file. The first tile representation encapsulates a first track of the plurality of tracks. The first track includes a first set of at least one of the plurality of motion-constrained tiles at a first tile location in the plurality of pictures. The first set of at least one of the plurality of motion-constrained tiles corresponds to a viewport of the 360-degree video data.

In some aspects, the first tile representation includes a Dynamic Adaptive Streaming over HTTP (DASH) representation. In some aspects, the media file includes a manifest file associated with an adaptive streaming format. For example, the media file can include a media presentation description (MPD).

In some aspects, the 360-degree video data includes a plurality of layers of pictures. The plurality of layers of pictures include at least one or more of different resolutions, different qualities, or different frame rates, or a combination thereof.

In some aspects, the media file includes an adaptation set. The adaptation set includes a plurality of tile representations of the 360-degree video data corresponding to different viewports. In some cases, the plurality of tile representations correspond to the different viewports and to at least one or more of different resolutions, different qualities, or different frames rates, or a combination thereof.

In some cases, the plurality of tile representations include the plurality of motion-constrained tiles, and the plurality of pictures divided into the plurality of motion-constrained tiles are part of at least one enhancement layer. The plurality of tile representations further include a plurality of pictures of a base layer. In some examples, the plurality of pictures of the base layer do not include motion-constrained tiles. In some examples, the plurality of pictures of the base layer include motion-constrained tiles.

In some aspects, the media file includes an adaptation set including a set of tile representations corresponding to different viewports (and, in some cases, at least one or more of different resolutions, different qualities, or different frames rates, or a combination thereof). In such aspects, for at least one layer, the media file includes a tile base representation encapsulating all motion-constrained tiles of pictures For example, a tile base representation can be generated for each layer of the bitstream. For example, a tile base representation can be generated for each layer of the bitstream. In some aspects, the tile base representation includes a DASH representation. In some cases, metadata applicable to the plurality of pictures of the 360-degree video data is defined for the tile base representation. The metadata includes information associated with at least one or more of a video projection type, one or more viewport directions, or region-wise mapping of the pictures, or a combination thereof.

In some aspects, a supplemental property element is defined for the tile base representation, the supplemental property element indicating that the tile base representation is a tile base representation. In some examples, a value of the supplemental property element includes a list of representation identifiers identifying a plurality of tile representations of the tile base representation.

In some aspects, metadata is defined for the first tile representation. The metadata is applicable to a region in a picture of the 360-degree video data that is covered by a motion-constrained tile at the first tile location in the pictures of the 360-degree video data. In some cases, the metadata includes information associated with at least one or more of a video projection type, one or more viewport directions, or region information of the first tile representation, or a combination thereof. The region information can include a most interested region, region-wise mapping, or other suitable picture region-based information.

In some aspects, a supplemental property element is defined for the first tile representation, the supplemental property element indicating that the first tile representation is a tile representation. In some examples, a value of the supplemental property element includes one or more offsets describing a position of the motion-constrained tile in the picture. In some aspects, the one or more offsets include a left offset and a top offset.

In some aspects, the media file includes a descriptor indicating one or more most interested regions in the 360-degree video data. In some cases, the descriptor is generated on a tile base representation level. A tile base representation encapsulates all motion-constrained tiles of pictures of at least one layer. In some examples, the descriptor includes an identifier of a tile representation containing a most interested region in the 360-degree video data. In some aspects, the descriptor includes one or more offsets indicating a location of the most interested region in a picture of the 360-degree video data. In some examples, the descriptor includes a width parameter indicating a width of the most interested region and a height parameter indicating a height of the most interested region.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 16 is a table illustrating an example of an @value of a SupplementalProperty descriptor for a tile base representation, in accordance with some examples;

FIG. 17 is a table illustrating an example of an @value of a SupplementalProperty descriptor for a tile representation, in accordance with some examples;

FIG. 18 is an XML code representation illustrating an example of an MPD file, in accordance with some examples;

FIG. 19 is a table illustrating an example of an @value of a SupplementalProperty descriptor for a tile base representation, in accordance with some examples;

FIG. 20A and FIG. 20B are XML code representations illustrating another example of an MPD file, in accordance with some examples;

FIG. 21 is a flowchart illustrating an example of a process of processing video data, in accordance with some examples;

FIG. 22 is a flowchart illustrating an example of a process of processing one or more video files, in accordance with some examples;

DETAILED DESCRIPTION

Figure 1:
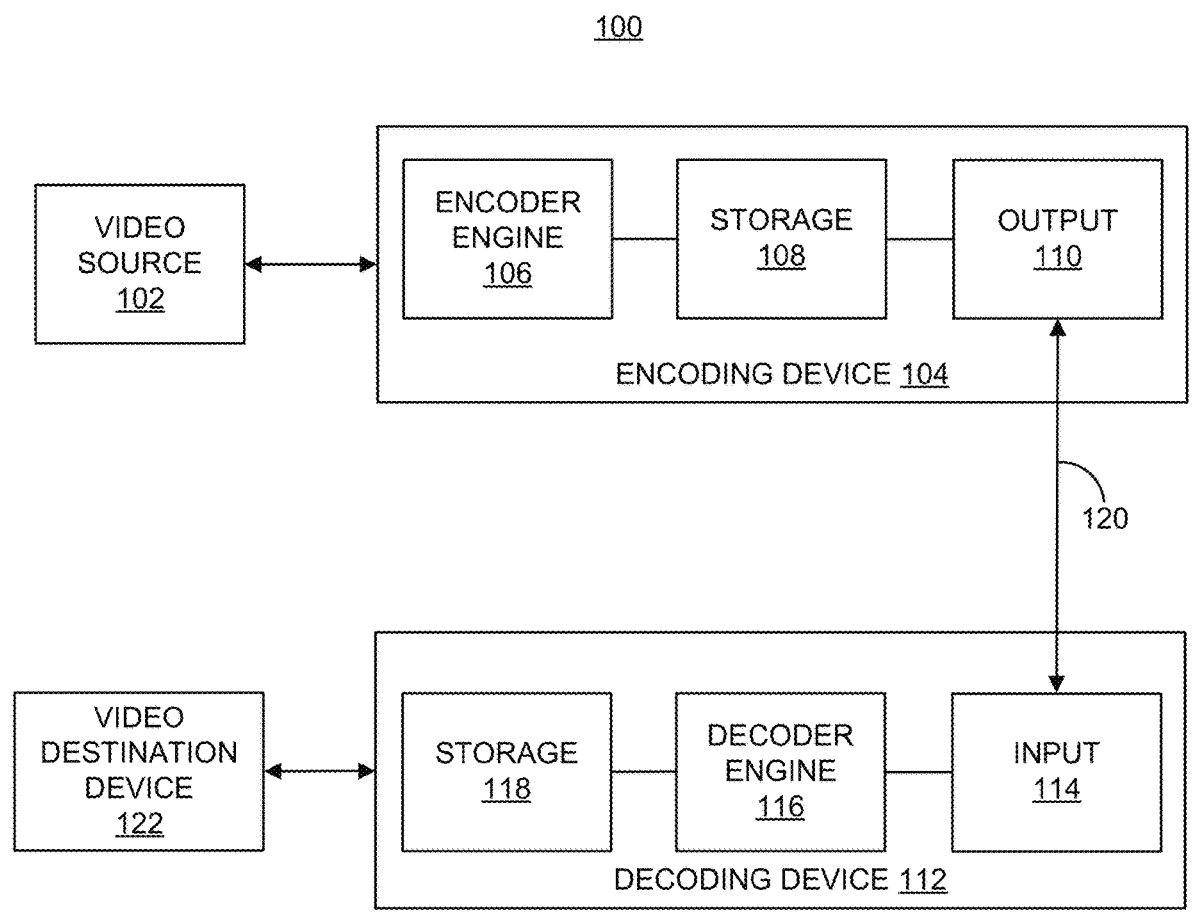
FIG. 1 is a block diagram illustrating an example of an encoding device and a decoding device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

In some examples, one or more systems and methods described herein are directed to generating and processing media files for viewport dependent 360-degree video coded content and/or for most interested regions in video content. For example, as described in more detail below, viewport dependent video coded content can be encoded by dividing the pictures of a video stream into motion-constrained tiles. Here, a motion-constrained tile is a tile region at a particular location in a picture (or frame) that can only be coded using one or more tiles at the same location in other pictures. For example, only the region of a reference picture that is within a particular tile location can be used to encode or decode a tile at that particular tile location in a current picture. Only the tiles of the pictures that are required to display a current viewport (also referred to as a field of view (FOV)) of a display device can be provided for display. As described in more detail below, most interested regions can also be determined based on user statistics. The most interested regions can be used for various purposes. Media files are generated using the techniques described herein, and are used for signaling the viewport dependent 360-degree video coded content and/or the most interested regions in the video content.

Video content can be captured and coded as 360-degree video content (also referred to as virtual reality (VR) content). 360-degree video can include virtual reality video, augmented reality data, or any other type of 360-degree type video content, whether captured, computer-generated, or the like. For example, 360-degree video can provide the ability to be virtually present in a non-physical world created by the rendering of natural and/or synthetic images (and in some cases sound) correlated by the movements of the immersed user, allowing the user to interact with that world. 360-degree video can represent a three-dimensional environment that can be interacted with in a seemingly real or physical way. In some cases, a user experiencing a 360-degree video environment uses electronic equipment, such as a head-mounted display (HMD), and optionally certain tools or clothing (e.g., gloves fitted with sensors), to interact with the virtual environment. As the user moves in the real world, images rendered in the virtual environment also change, giving the user the perception that the user is moving within the virtual environment. In some cases, the virtual environment includes sound that correlates with the movements of the user, giving the user the impression that the sounds originate from a particular direction or source. 360-degree video can be captured and rendered at very high quality, potentially providing a truly immersive 360-degree video or virtual reality experience. 360-degree video applications include gaming, training, education, sports video, online shopping, among others.

360-degree video is video captured for display in a 360-degree environment. In some applications, video from the real world can be used in the presentation of a virtual reality environment, as opposed to computer-generated graphics, such as may be found in gaming and virtual worlds. In these applications, a user can experience another location in the same way that the user can experience the user's present location. For example, a user can experience a walking tour of Berlin while using a 360-degree video system that is situated in San Francisco.

A 360-degree video system can include a video capture device and a video display device, and possibly also other intermediate devices such as servers, data storage, and data transmission equipment. A video capture device may include a camera set, which can include a set of multiple cameras, each oriented in a different direction and capturing a different view. In one illustrative example, six cameras can be used to capture a full 360-degree view centered on the camera set's location. Some video capture devices may use fewer cameras. For example, some video capture devices capture primarily side-to-side views or use lenses with a wide field of view. A video generally includes frames or pictures, where a frame or picture is an electronically coded still image of a scene. Cameras capture a certain number of frames per second, which is usually referred to as the camera's frame rate.

In some cases, to provide a seamless 360-degree view, image stitching can be performed on the video captured by each of the cameras in the camera set. Image stitching in the case of 360-degree video generation involves combining or merging video frames from adjacent cameras in the area where the video frames overlap or would otherwise connect. The result would be an approximately spherical frame, and similar to a Mercator projection, the merged data can be represented in a planar fashion. For example, the pixels in a merged video frame may be mapped onto the planes of a cube shape, or some other three-dimensional, planar shape (e.g., a pyramid, an octahedron, a decahedron, etc.). Video capture and video display devices can operate on a raster principle—meaning that a video frame is treated as a grid of pixels—in which case square planes, rectangular planes, or other suitably-shaped planes can be used to represent a spherical environment.

360-degree video frames, mapped to a planar representation, can be encoded and/or compressed for storage and/or transmission. Encoding and/or compression can be accomplished using a video codec (e.g., code that is compliant with the High-Efficiency Video Coding (HEVC) standard, which is also known as H.265, the Advanced Video Coding standard, which is known as H.264, or other suitable codec) and results in a compressed video bitstream (or encoded video bitstream) or group of bitstreams. Encoding of video data using a video codec is described in further detail below.

In some implementations, the encoded video bitstream(s) can be stored and/or encapsulated in a media format or file format. The stored bitstream(s) can be transmitted, for example, over a network, to a receiver device that can decode and render the video for display. Such a receiver device may be referred to herein as a video display device. For example, a 360-degree video system can generate encapsulated files from the encoded video data (e.g., using an International Standards Organization (ISO) base media file format and/or derived file formats). For instance, the video codec can encode the video data and an encapsulation engine can generate the media files by encapsulating the video data in one or more ISO format media files. Alternatively or additionally, the stored bitstream(s) can be provided directly from a storage medium to a receiver device.

A receiver device can also implement a codec to decode and/or decompress an encoded video bitstream. In cases in which the encoded video bitstream(s) are stored and/or encapsulated in a media format or file format, the receiver device can support the media or file format that was used to pack the video bitstream into a file (or files), and can extract the video (and possibly also audio) data to generate the encoded video data. For example, the receiver device can parse the media files with the encapsulated video data to generate the encoded video data, and the codec in the receiver device can decode the encoded video data.

The receiver device can then send the decoded video signal to a rendering device (e.g., a video display device, player device, or other suitable rendering device). Rendering devices include, for example, head-mounted displays, virtual reality televisions, and other 180 or 360-degree display devices. Generally, a head-mounted display is able to track the movement of a wearer's head and/or the movement of a wearer's eyes. The head-mounted display can use the tracking information to render the part of a 360-degree video that corresponds to the direction in which the wearer is looking, so that the wearer experiences the virtual environment in the same way that she would experience the real world. A rendering device may render a video at the same frame rate at which the video was captured, or at a different frame rate.

The video pictures of 360-degree video content can be encoded as a single-layer bitstream using temporal inter prediction (TIP), and the entire coded bitstream can be stored at a server. In some cases, the pictures of 360-degree video content can be encoded as a multi-layer bitstream using TIP and inter-layer prediction (ILP). If needed, the bitstream can be transmitted to the receiver side, fully decoded by the decoder, and the region of the decoded picture corresponding to the current viewport is rendered to the user.

FIG. 1 is a block diagram illustrating an example of a video coding system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, and High Efficiency Video Coding (HEVC) or ITU-T H.265. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions has been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). MPEG and ITU-T VCEG have also formed a joint exploration video team (WET) to explore new coding tools for the next generation of video coding standard. The reference software is called JEM (joint exploration model).

Many embodiments described herein provide examples using the JEM model, the HEVC standard, and/or extensions thereof. However, the techniques and systems described herein may also be applicable to other coding standards, such as AVC, MPEG, extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame of a video is a still image of a scene. The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. The slices are then partitioned into coding tree blocks (CTBs) of luma samples and chroma samples. A CTB of luma samples and one or more CTBs of chroma samples, along with syntax for the samples, are referred to as a coding tree unit (CTU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with Intra prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

The encoding device 104 may then perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bitrate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can be use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data.

The input 114 of the decoding device 112 receives the encoded video bitstream data and may provide the video bitstream data to the decoder engine 116, or to storage 118 for later use by the decoder engine 116. The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of specific details of the encoding device 104 is described below with reference to FIG. 23. An example of specific details of the decoding device 112 is described below with reference to FIG. 24.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

In some implementations, camera sets for capturing 360-degree video can include omnidirectional cameras, catadioptric cameras (a camera that uses lenses and curved mirrors), cameras equipped with fisheye lenses, and/or other suitable cameras. One example of an omnidirectional camera is the Ricoh Theta-S, which uses two fisheye lenses that focus in opposite directions.

Figure 2B:
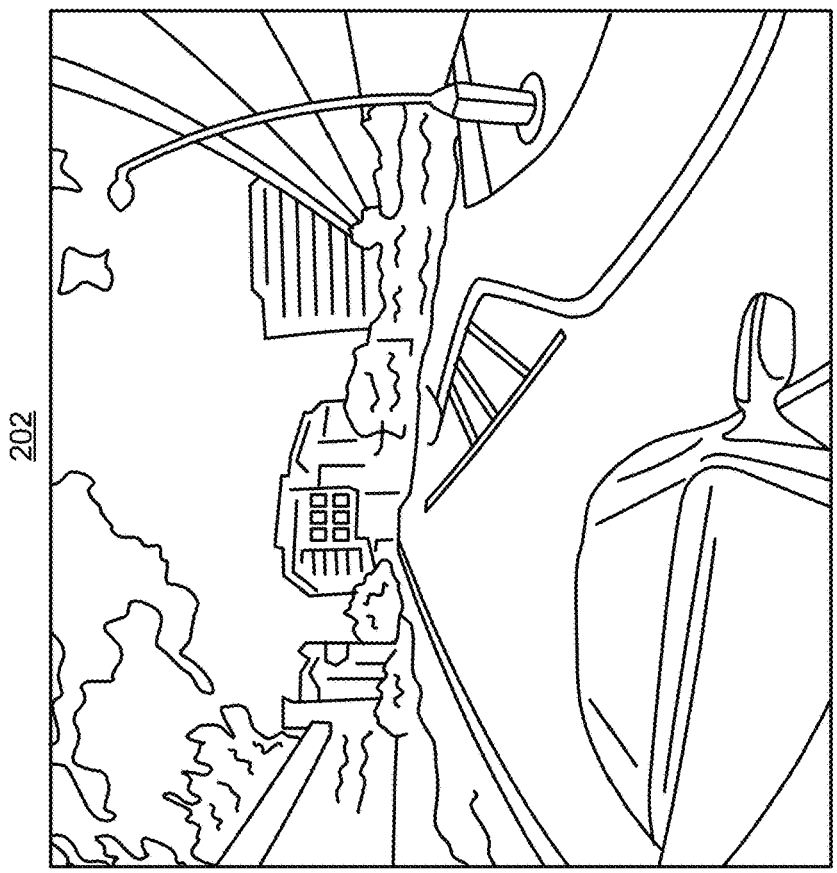
FIG. 2A and FIG. 2B are diagrams illustrating examples of video frames captured by omnidirectional cameras that use fisheye lenses to capture a wide field of view, in accordance with some examples.
Figure 2A:
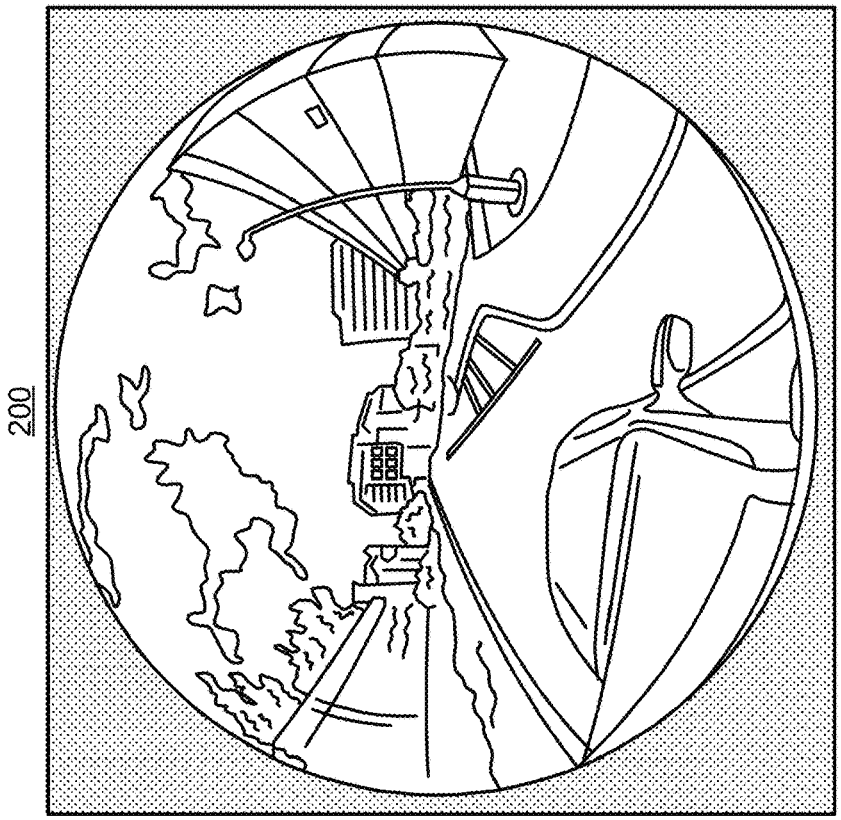

Omnidirectional cameras, such as catadioptric cameras and cameras with fisheye lenses, typically capture images with a significant amount of distortion. FIG. 2A and FIG. 2B illustrate examples of video frames captured by omnidirectional cameras that use fisheye lenses to capture a wide field of view. In the example of FIG. 2A, the video frame 200 includes a circular fisheye image. Fisheye lenses are capable of capturing very wide angles, such as 280 degrees or greater. Hence, a camera equipped with two fisheye lenses, positioned back-to-back, can capture two images that together provide 360 degrees of view (or more). Non-wide-angle fisheye lenses capture a field of view of on the order of about 45 to about 90 degrees. A field of view can alternatively or additionally be expressed in radians.

In order to capture a wide angle, fisheye lenses distort the image of a scene. As illustrated in FIG. 2A, the scene captured in the video frame 200 is circular in shape, and is warped from the center to the outside edges of this circular region. Because camera sensors are rectangular, the video frame 200 is rectangular and the image includes areas, here illustrated using stippling, that are not part of the scene. The pixels in these regions are considered not usable, since these pixels are not part of the scene.

The example of FIG. 2B includes a video frame 202 that includes a full-frame fisheye image. In this type of video frame 202, a wide-angle field of view has also been captured in a circular region, with the scene being warped into the circular region. In this example, the image has been scaled (e.g., made larger) so the scene fills the edges of the rectangular frame. This example video frame 202 does not include the unusable areas, and some parts of the scene that can be captured by the lens have been cropped out or not captured.

Figure 3:
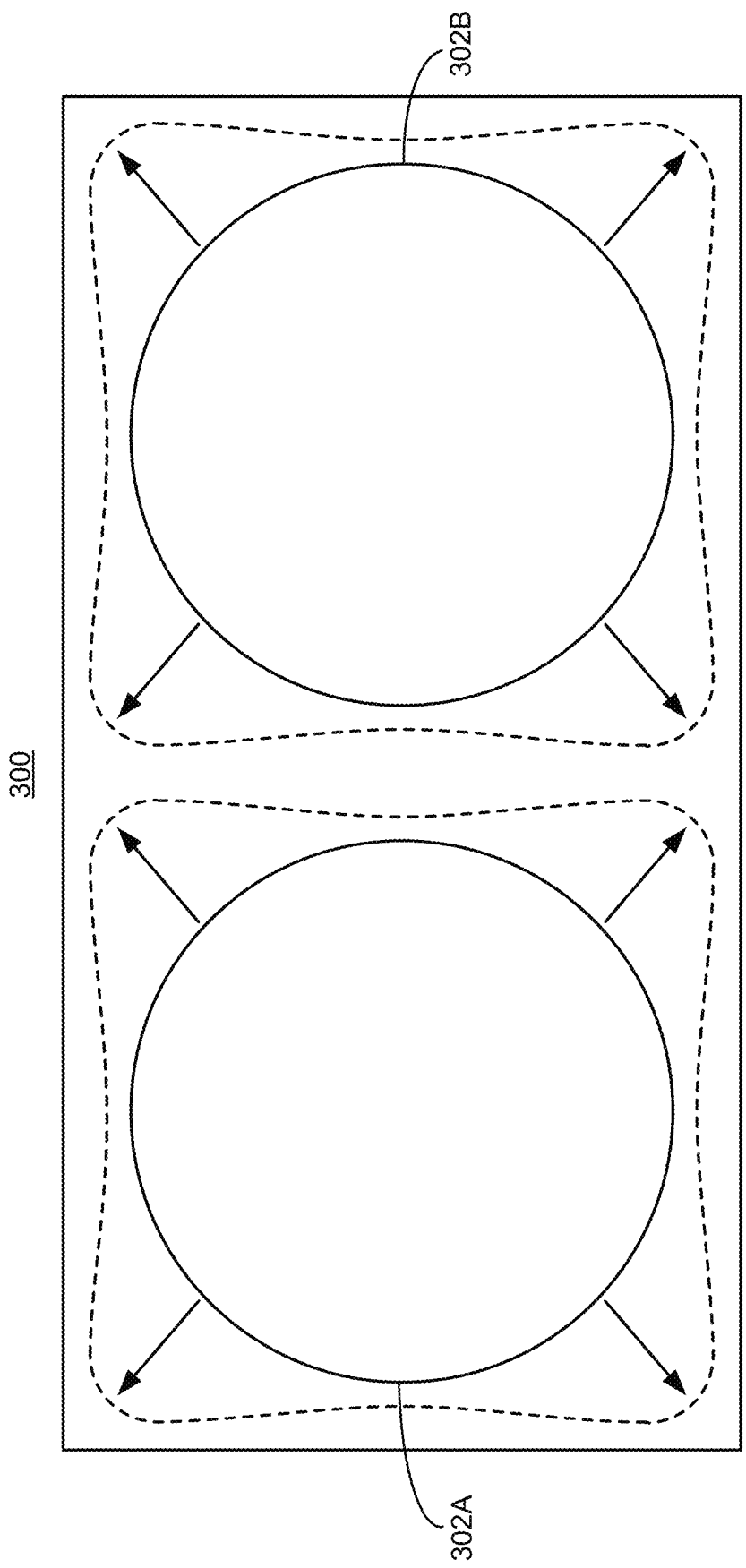
FIG. 3 is a diagram illustrating an example of an equirectangular video frame, in accordance with some examples.

360-degree video that uses fisheye images to capture a wide field of view can be remapped to other formats. These other formats can be used to store, transmit, and/or view the 360-degree video. One example format is an equirectangular format. FIG. 3 illustrates an example of an equirectangular video frame 300. In this example equirectangular video frame 300, the usable pixels from two fisheye images 302A, 302B (e.g., pixels in the circular regions) have been mapped into an equirectangular format. In this example, each fisheye image 302A, 302B includes a 180-degree or greater field of view, so that, together, the two fisheye images 302A, 302B encompass a 360-degree field of view (possibly with some overlap).

Mapping pixels from the fisheye images 302A, 302B has the effect of unwarping the scene captured in the fisheye images 302A, 302B, and stretching the pixels towards the edges of the video frame 300. The resulting equirectangular image may appear stretched at the top and bottom of the video frame 300. A well-known equirectangular projection is a Mercator projection, in which the geography of the Earth is presented with orthogonal latitude and longitude lines.

In various implementations, the fisheye images 302A, 302B can be mapped to other formats, such as a onto the faces formed by a cube, a cylinder, a pyramid, a truncated pyramid, or some other geometric shape. In each of these cases, distortion present in the fisheye images 302A, 302B can be corrected and unusable pixels can be eliminated. The planar data can also be packaged for storage and/or transmission, and can be used for displaying the 360-degree video.

In some cases, an intermediate format can be useful, for example, for storing and/or transmitting 360-degree video data, or for converting the video data to another format. For example, an equirectangular representation can be mapped to a spherical format (e.g., a spherical geometry) to display the video data, as illustrated in FIG. 4.

Figure 4:
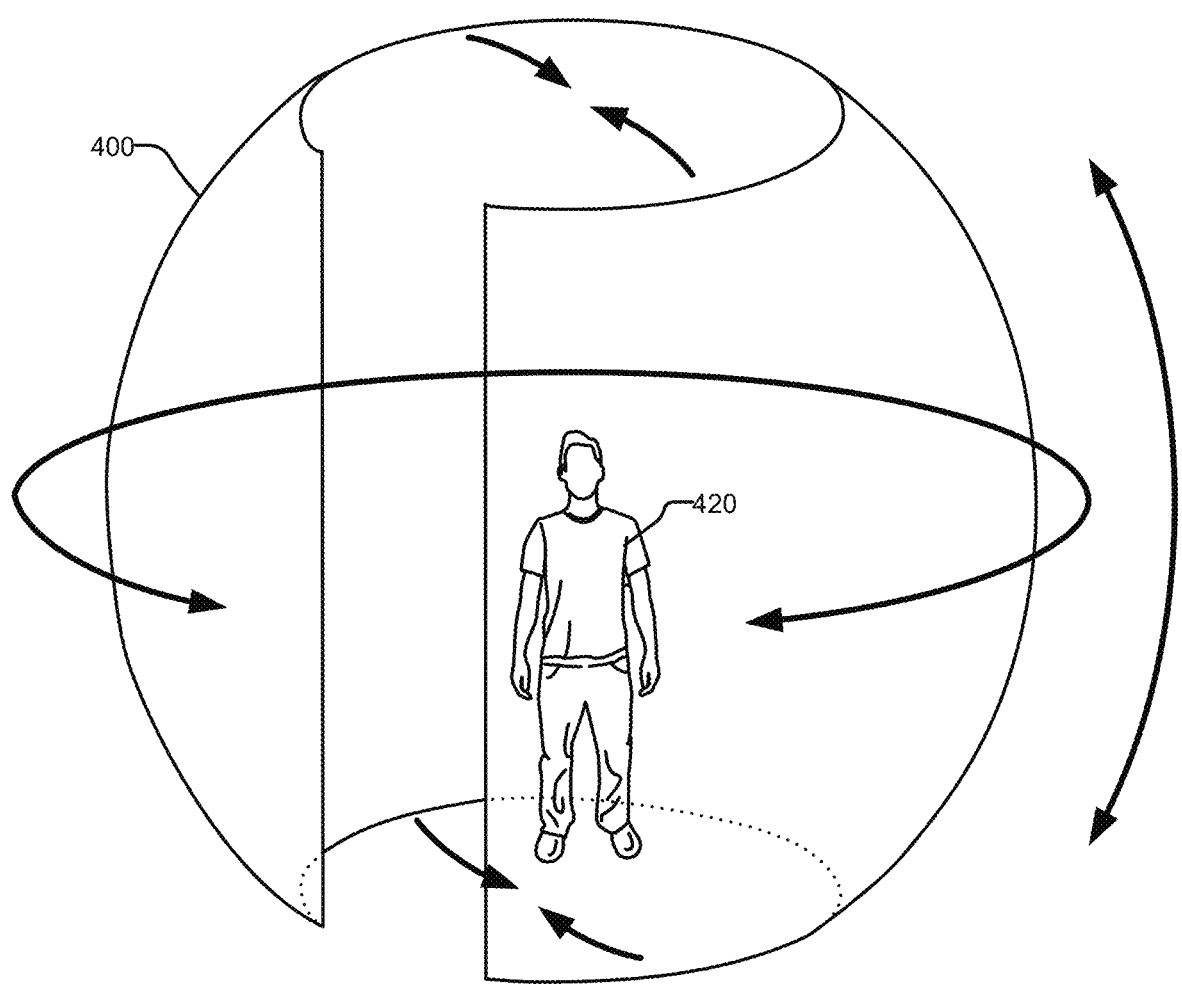
FIG. 4 is a diagram illustrating an example of an equirectangular video frame being used in a 360 degree video presentation, in accordance with some examples.

FIG. 4 illustrates an example of an equirectangular video frame 400 being used in a 360-degree video presentation. The equirectangular video frame 400 can be mapped onto a spherical geometry, and a resulting spherical representation can be displayed to a viewer 420 using a head-mounted display or some other 360-degree video display device. In other examples, the equirectangular video frame 400 can be mapped to a cubical, cylindrical, pyramidal, or some other geometric shape, where the geometric shape can be used by the 360-degree video display device to display the video.

As noted above, an equirectangular video frame 400 can capture a full 360-degree field of view, with the pixels in the upper and lower regions appearing stretched and/or compressed. To use the equirectangular video frame 400 in a 360-degree video presentation, the pixels in the equirectangular video frame 400 can be mapped to a spherical representation. This mapping can have the effect of expanding the upper and lower regions of the equirectangular video frame 400 towards the top and bottom (e.g., the "north pole" and "south pole", respectively) of the spherical representation. Expanding the upper and lower regions can correct distortion in these areas that is apparent in the equirectangular video frame 400.

Mapping the equirectangular video frame 400 to a spherical representation can further have the effect of wrapping the width of the frame around the center (e.g., the equator) of the spherical representation. The left and right edges of the equirectangular video frame 400 can be mapped next to each other, so that no "seam" appears.

Once the equirectangular video frame 400 has been mapped to a spherical representation, the spherical representation can be displayed. A viewer 420, using a head-mounted display or another 360-degree video display device, can view the spherical representation from within the spherical representation. In most cases, the viewer 420 is positioned such that the "ground," from the viewer's perspective, is the bottom-most point of the spherical representation. In some cases, the equator of the spherical representation is positioned at the viewer's eye level. In various implementations, the spherical representation can be expanded or contracted to suit the viewer's height and/or position (e.g., if the viewer is sitting, standing, or in some other position).

Figure 5A:
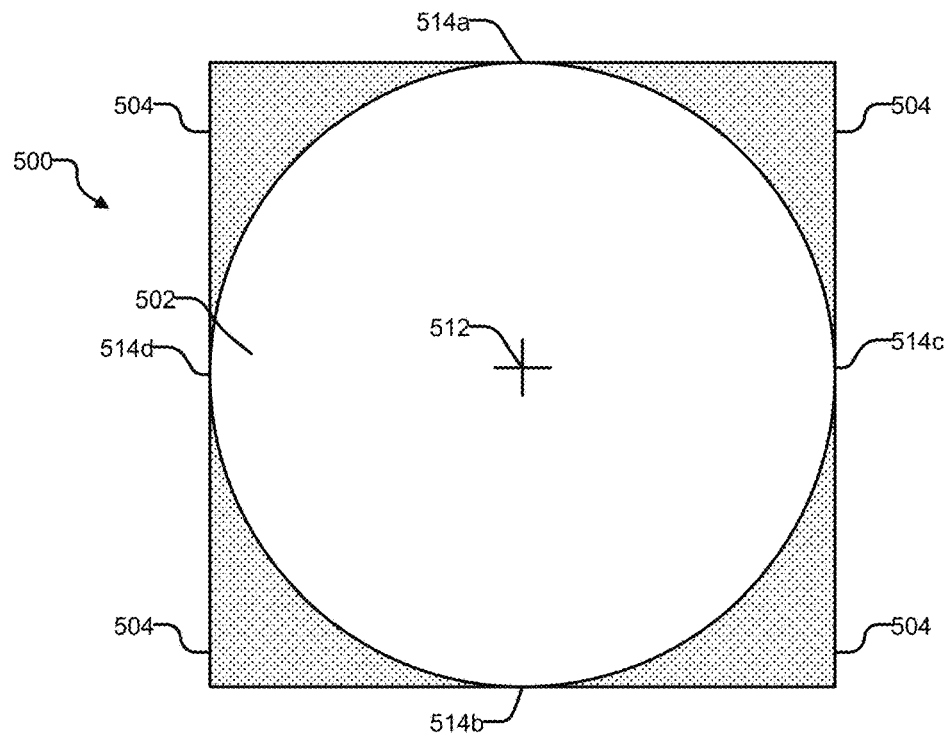
FIG. 5A and FIG. 5B are diagrams illustrating an example where a fisheye image in a 360-degree video frame has been mapped directly to a hemispherical representation, in accordance with some examples.
Figure 5B:
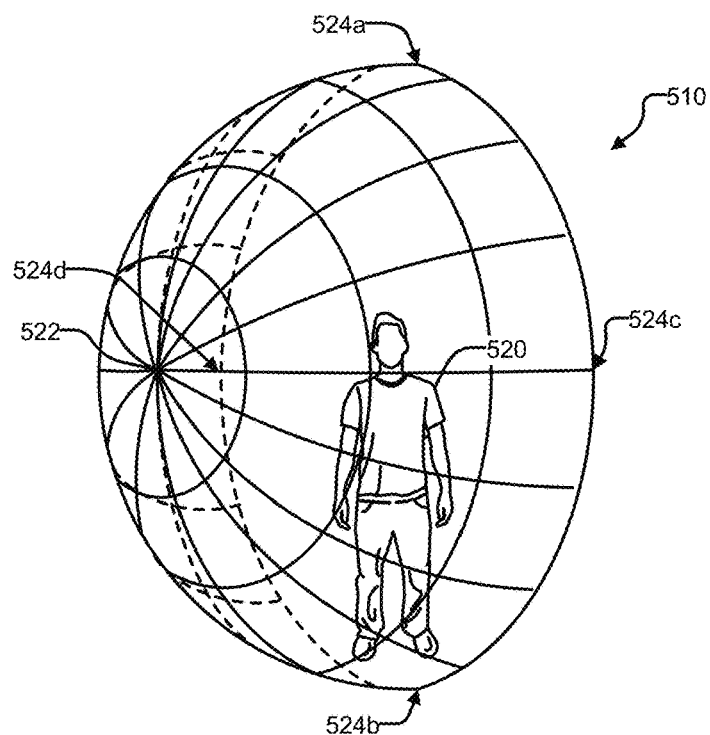

In some cases, however, an intermediate format, such as an equirectangular format, is not necessary. In various implementations, instead of first mapping to an equirectangular shape, fisheye images in 360-degree video can be mapped directly to a representation that can be displayed. FIG. 5A and FIG. 5B illustrate an example where a fisheye image in a 360-degree video frame 500 has been mapped directly to a hemispherical representation 510. As discussed above, the video frame 500 of FIG. 5A is rectangular in shape, where the rectangular shape corresponds to the size and shape of the camera's image capture sensor. The video frame 500 includes a circular region 502 that includes pixels that capture a scene. The corners 504 of the video frame 500, where no pixels were captured, can be left blank or can include black pixels (e.g., with a pixel value of 0 or 255).

The pixels captured in the circular region 502 include a certain field of view, where the field of view is dictated by the lens and/or camera. For example, the circular region 502 can include a 90-degree field of view, a 180-degree field of view, a 270-degree field of view, or a field of view of some other degree, depending on the construction of the camera's lens, mirror(s), and/or sensor. The field of view can alternatively or additionally be expressed in radians. To fit the field of view into the video frame 500, the pixels are warped into the circular region 502 in a linear or non-linear manner.

In various implementations, the techniques described below map the pixels in the circular region 502 to a hemispherical representation 510, an example of which is illustrated in FIG. 5B. The hemispherical representation 510 can then be used to present the video frame 500 to a viewer 520 using a 360-degree video display device. The hemispherical representation 510 can be half of a sphere (which represents 180 degrees of view), less than half of a sphere (e.g., when the video frame 500 captures less than 180 degrees of view), or greater than half of a sphere (e.g., when the video frame 500 captures more than 180 degrees of view).

In various implementations, mapping the circular region 502 of the video frame 500 to the hemispherical representation 510 can have the effect of stretching the pixels in the circular region 502 into a hemispherical shape. For example, the center 512 of the circular region 502 can correspond to the center 522 or apex of the hemispherical representation 510. As a further example, the top-most point 514a of the circular region 502 can correspond to the top-most point 524a (e.g. polar north) of the hemispherical representation 510, and the bottom-most point 514b of the circular region 502 can correspond to the bottom-most point 524b (e.g. polar south) of the hemispherical representation 510. Similarly, the far right 514c and far left 514d of the circular region 502 can correspond to what in this example are the far right 524c of the hemispherical representation 510 and the not-visible far-left 524d. The pixels in between the center 512 and edges of the circular region 502 can further be evenly distributed over the surface of the hemispherical representation 510.

The resulting hemispherical representation 510 can be used to present the flat video frame 500 in a 360-degree video presentation. Using a 360-degree video display device, the hemispherical representation 510 can be rendered such that a viewer 520 is given the impression that he is inside of the scene represented by the pixels captured by the hemispherical representation 510. In some cases, the apex of the hemispherical representation 510 can be oriented to be in the center of the viewer's field of view.

In various implementations, an additional hemispherical representation can be provided for the view that would be behind the viewer 520. For example, as noted above, a camera can be equipped with two fisheye lenses that are positioned back-to-back. The camera can capture two images that together provide 360 degrees of view (or more) of a scene. In such an example, the camera can capture a second fisheye image (not shown), which can be included in the same frame 500 as the fisheye image shown in FIG. 5 or can be included in a different frame. The second fisheye image can be mapped directly to another hemispherical representation (not shown) that is directly behind the viewer 520. The two half-spheres make up a full sphere, which can be rendered for display to provide a full 360-degree view of the scene captured by the video frame(s).

Some video systems support streaming media data over a network, in addition to supporting local playback of the media. For example, one or more ISO base media file format files can include a movie presentation and can include hint tracks, which contain instructions that can assist a streaming server in forming and transmitting the file or files as packets. These instructions can include, for example, data for the server to send (e.g., header information) or references to segments of the media data. A file can include separate hint tracks for different streaming protocols. Hint tracks can also be added to a file without needing to reformat the file.

Figure 6:
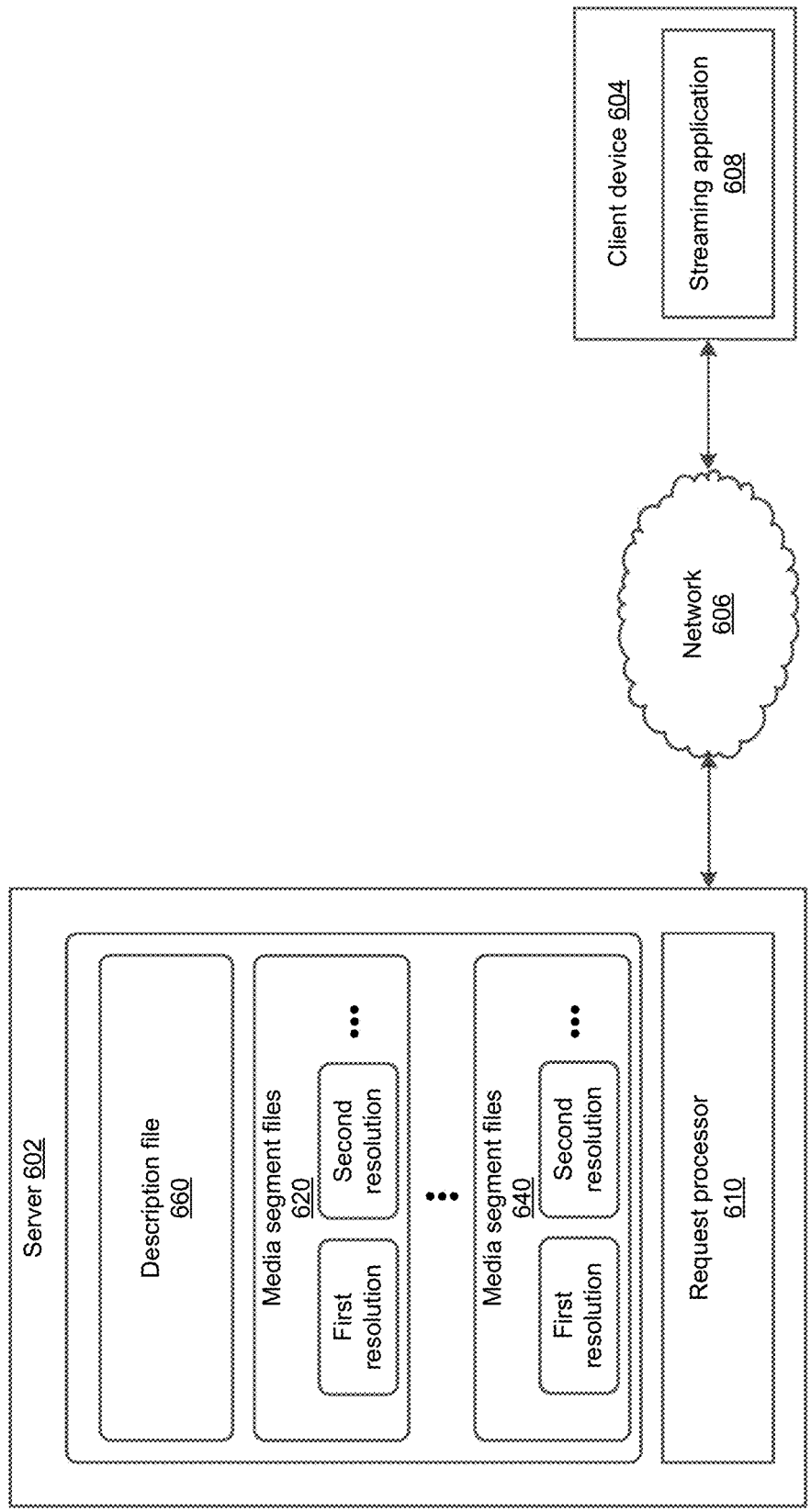
FIG. 6 illustrates an example system for media streaming, in accordance with some examples.

Reference is now made to FIG. 6, which illustrates an example system 600 for streaming. System 600 includes a server 602 and a client device 604 communicatively coupled with each other over network 606 based on a networking protocol. For example, server 602 can include a conventional HTTP web server, and client device 604 may include a conventional HTTP client. An HTTP communication channel can be established, in which client device 604 can transmit an HTTP request to server 602 to request one or more network resources. The server 602 can transmit a HTTP response back to client device 604 including the requested network resource(s). One example of a network resource hosted by server 602 can be media content, which can be divided into media segments. A media segment can include a sequence of video frames. Client device 604 may include a streaming application 608 to establish a streaming session with server 602 over network 606. During the streaming session, streaming application 608 can transmit a request for one or more media segments to a request processor 610 of server 602 over network 606. The streaming application 608 can receive the requested one or more media segments, and can render some or all of the received media segments on client device 604, before transmitting a subsequent request for other media segments. Using such HTTP streaming, the streaming application 608 does not need to wait until the entire media content has been completely downloaded before rendering the media content at client device 604, which can facilitate better utilization of the network resources and improve user experience.

To enable high quality streaming of media content using conventional HTTP web servers, adaptive bitrate streaming can be used. With adaptive bitrate streaming, for each media segment, client device 604 can be provided with information about a set of alternative segment files 620 and 640. Here, a media segment may refer to a portion of a media bitstream associated with a particular playing timestamp and duration. Each set of alternative segment files 620 and 640 may correspond to a particular representation of the media segment (e.g., associated with a particular playing timestamp and duration). A representation may refer to a particular result of encoding certain media content with different qualities (e.g., with a different bitrate, frame rate, or the like). Among each set of media segment files, each media segment file can be associated with a set of properties including, for example, a particular bitrate, frame rate, resolution, audio language, or the like. Based on local information (e.g., bandwidth of network 606, decoding/displaying capabilities of client device 604, user preference, or other information), the streaming application 608 can select, for each representation, a particular media segment file from the set. As an illustrative example, client device 604 can transmit a request for a media segment file that is associated with a first resolution from media segment files 620. Subsequently, due to a change in the bandwidth of the network 606, the client device 604 may transmit another request for a media segment file associated with a second resolution.

The information about the set of alternative segment files 620 and 640 can be part of a description file 660 (or manifest file) maintained by the server 602. Client device 604 can obtain the description file 660 from the server 602, and can transmit requests for the media segment files based on description file 660. Description file 660 may include, for example, a list of a set of alternative media segment files for each representation of the media content, and the properties associated with each alternative media segment file (e.g., bitrate, frame rate, resolution, audio language, etc.). The description file 660 can also include includes location identifiers (e.g., Uniform Resource Locator (URL), Uniform Resource Indicator (URI), etc.) associated with the storage locations of the alternative media segment files.

Figure 7:
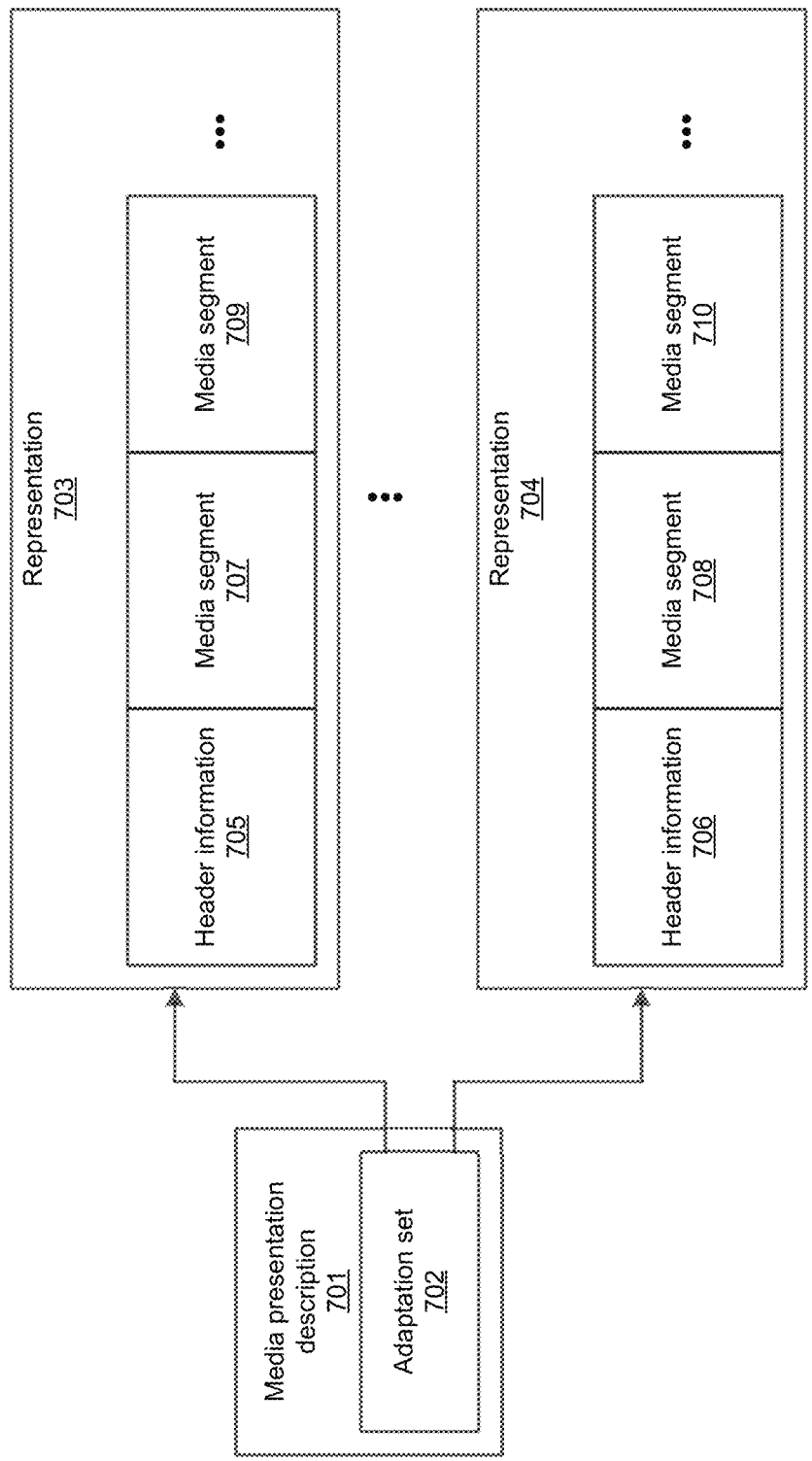
FIG. 7 provides a graphical representation of an example of media presentation description (MPD) file, in accordance with some examples.

Various protocols exist for adaptive bitrate streaming. One example is Dynamic Adaptive Streaming over HyperText Transfer Protocol (HTTP), or DASH (defined in ISO/IEC 23009-1:2014). DASH, which is also known as MPEG-DASH. Under DASH, the description file 660 can include a media presentation description (MPD). FIG. 7 is a diagram illustrating an example of an MPD 701. In some cases, the MPD 701 can be represented in eXtensible Markup Language (XML). The MPD 701 can include a set of elements that define an adaptation set 702. The adaptation set 702 can include a set of alternative representations 703 and 704. One of ordinary skill will appreciate that the adaptation set 702 can include additional representations in addition to the representations 703 and 704. Each alternative representation 703 and 704 can be associated with a particular bitrate, resolution, or other quality, and can include a set of media segments. For example, the representation 703 includes media segments 707 and 709, and also header information 705. The representation 704 includes media segments 708 and 710, and also header information 706. The header information 705 and 706 may include, for example, the "Representation" element (e.g., including identifier, bandwidth, width and height attributes, or the like). Each of the media segments 707 and 709 may be associated in the MPD 701 with a URL of a media segment file, which can be denoted as the element "SegmentURL." Each of the set of elements in the MPD 701 may be associated with a set of attributes which define the properties of, for example, the adaptation set 702, the representations 703 and/or 704, or other information.

Below is an example of part of an MPD:

<AdaptationSet mimeType="video/mp2t">
    Representation id="720p" bandwidth="3200000" width="1280" height="720">
    . . .
    <SegmentURL media="segment-1.DASH"/>
    <SegmentURL media="segment-2.DASH"7>
    . . .

In the example MPD shown above, texts such as "Period", "AdaptationSet", "Representation", "SegmentURL", etc. are elements, whereas "mimeType", "id", "bandwidth", "width" and "height", "media", etc. are attributes. In this example, the adaptation set includes one representation associated with a particular bandwidth and frame size, and includes a set of media segments represented by their URLs.

Another example for adaptive bitrate streaming is HTTP Live Streaming (HLS), which provides streaming of file segments associated with the Transport Stream (TS) format. Transport stream specifies a container format encapsulating packetized elementary streams (PES). Each PES comprises an encapsulation of sequential data bytes from a video or audio decoder into PES packets. Using HLS, a server can provide a set of playlist files (also referred to as a description file or manifest file) to a media player device. Each of the playlist files can include links to a sequence of file segments in the TS format and associated with a particular bitrate. In some cases, a playlist file can be in the format of .m3u8 format. A variant playlist file can refer to a set of playlist files, each of which can be associated with a set of media segment files for the same presentation (e.g., a sequence of video frames), and each of the set of playlist file can be associated with a different bitrate. The receiver device can be provided with a variant playlist file and, based on the local condition (e.g., network bandwidth), selects the playlist file associated with a particular bandwidth, bitrate, frame rate, etc. The receiver device may then use the information of the selected playlist file to obtain the media segment files for streaming.

In some examples, viewport dependent 360-degree (or VR) video systems can be used. A distinct feature of 360-degree video as compared to normal (non-360-degree or non-VR) video is that, in 360-degree video, typically only a subset of the entire video region represented by the video pictures (corresponding to the current field of view (FOV) or viewport of the viewing device) is displayed, while in normal video applications, typically the entire video region is displayed. The FOV or viewport is the area currently being presented by the display device and being seen by the user or observer. The terms FOV and viewport are used interchangeably herein. The viewport-based feature may be utilized to improve the performance of 360-degree video systems. For example, viewport dependent projection mapping and/or viewport dependent video coding can be performed. Performance improvement based on such viewport-based features can include, at least, either or both of lower transmission bandwidth and lower decoding complexity compared to conventional 360-degree video systems under the same resolution and/or quality of the video part presented to the user.

In some cases, as noted above, viewport dependent projection mapping can be performed. Viewport dependent projection mapping can also be referred to as asymmetric projection mapping. One example is a sub-sampled cube-map. A typical cube-map includes six equal-sized faces. In one example of a sub-sampled cub-map, one of the faces can be kept unchanged, while the face on the opposite side can be sub-sampled or down-scaled to a smaller size located at the center area of the original face shape, and other faces are geometrically scaled accordingly (still keeping the six faces). An extreme example is to down-scale the face on the opposite side to be a single point, and thus the cube becomes a pyramid. In another example of sub-sampled cube-map, some faces are proportionally down-sized, such as by a 2×2 ratio (e.g., 2:1 in each direction parallel to an edge of the face) or other suitable ratio. Such down-sized scaling can also be applied to different regions for other projection mappings, such as equi-rectangular. One example is to down-size both the upper and bottom regions (the poles).

In some cases, viewport dependent video coding may be performed. Viewport dependent video coding can also be referred to as viewport based partial video decoding. A key feature of viewport dependent video coding is to enable decoding of only part of the entire encoded video region to provide sufficient information for display of the current viewport or FOV.

Figure 8:
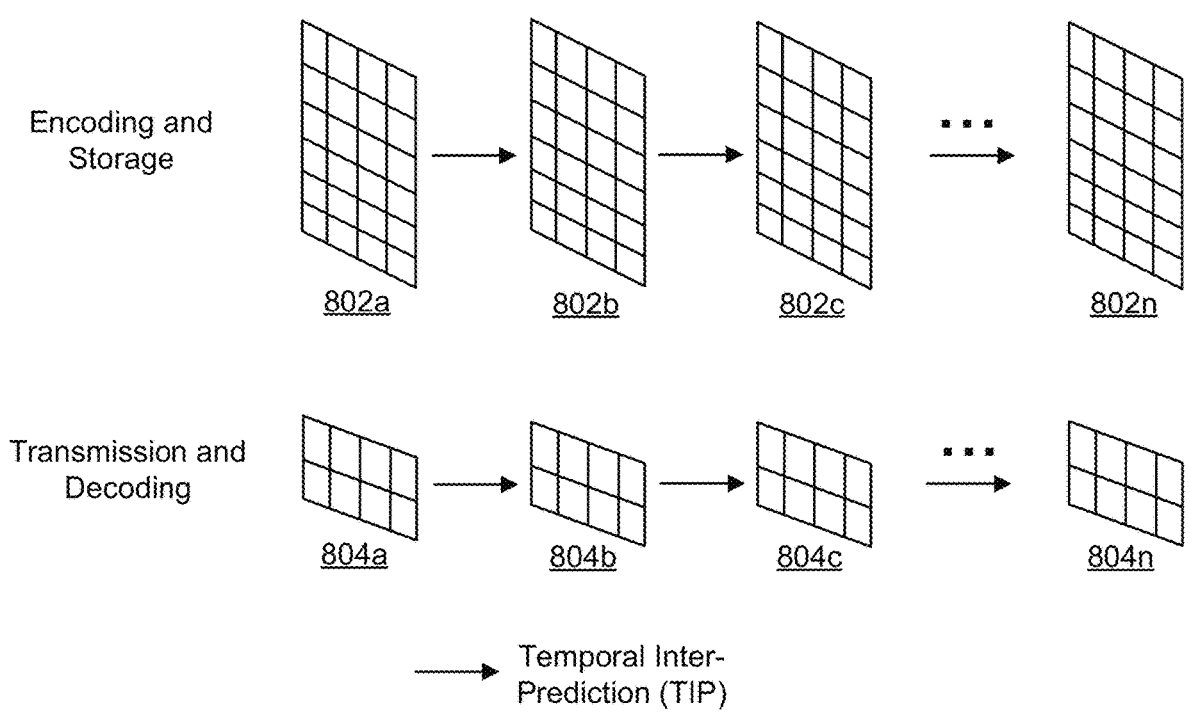
FIG. 8 is a diagram illustrating Simple Tile based Partial Decoding (STPD), in accordance with some examples.

In one example of viewport dependent video coding, the 360-degree (or VR) video is coded using motion-constrained sets of tiles, such that each potential region covering a viewport can be independently decoded from other regions. For a particular current viewport, the coded video data of the minimum set of independently decodable tiles that cover the current viewport is sent to the client, decoded, and displayed. This method is referred to as Simple Tile based Partial Decoding (STPD), and is depicted in FIG. 8. In some cases, the video data of the tiles covering the current viewport can be sent to a client using an HTTP streaming protocol, such as DASH or other suitable protocol.

As shown in FIG. 8, the full pictures 802a, 802b, 802c through 802n of a video sequence (e.g., a video segment of a video representation) are encoded and stored at an encoding device or other transmitter-side device. As shown, the pictures 802a, 802b, 802c through 802n are divided into motion-constrained tiles, with each picture including 24 motion-constrained tiles. Each tile has a corresponding location in each picture, as described in more detail below with respect to FIG. 13. As shown, temporal inter-prediction can be performed to encode the pictures 802a, 802b, 802c through 802n using one or more of the pictures 802a, 802b, 802c through 802n as reference pictures.

Only the portion of tiles from the full pictures 802a, 802b, 802c through 802n that cover the current viewport are transmitted to and decoded by a client device (e.g., a VR headset, a mobile device, or other suitable 360-degree enabled viewing device). For example, the partial pictures 804a, 804b, 804c through 804n include the tiles necessary to decode the portion of the pictures 802a, 802b, 802c through 802n that correspond to the current viewport being viewed by a user of the client device. As shown, temporal inter-prediction is performed to decode the partial pictures 804a, 804b, 804c through 804n using one or more of the partial pictures 804a, 804b, 804c through 804n as reference pictures.

A shortcoming of the STPD approach is that, when the user turns his or her head quickly to a new viewport that is not covered (entirely or partially) by the sent video data (e.g., the tiles covering the current viewport), the area not covered by the tiles of the video data cannot be seen before the data covering the new viewport arrives and is decoded and displayed. For example, nothing in the new area (covered by the new viewport but not the old viewport) can be seen before the video data of the tiles covering the new viewport arrive and the video data is sufficiently buffered according to the buffering timeline. Such a delay can easily occur unless the round trip time of the network is extremely low (e.g., at a magnitude of 10 ms or other value), which is not feasible or is at least a big challenge today or in the near future where network bandwidth often is limited and/or where limiting network traffic is desirable.

In another example of viewport dependent video coding, video bitstreams of multiple qualities (e.g., resolutions, bitrates, frame rates, or a combination thereof) are scalable-coded using a scalable video codec, such as SHVC or other scalable video codec. In such viewport dependent video coding, the entire bitstream of the lowest quality video (e.g., the base layer) can always be sent. In some cases, the lowest quality video does not need to be coded using tiles or motion-constrained sets of tiles. In other cases, the lowest quality video can be coded using tiles or motion-constrained sets of tiles. Other aspects of scalable based viewport dependent video coding are similar to the STPD technique described above. The scalable based viewport dependent video coding approach allows more efficient coding of the lowest quality video, because coding of tiles or tile motion-constrained sets of tiles reduces coding efficiency, and also allows more efficient coding of streams of higher qualities due the use of inter-layer prediction. Furthermore, this approach also allows for more efficient viewport switching, because once viewport switching starts, the transmitter-side device (e.g., a server or edge server) can immediately stop sending video data that is from the video stream of a higher resolution (than the base layer) and that is not covering any region of the new viewport. If the video data of the lowest resolution covering the current viewport is not sent (in which case only the video data of the highest quality covering the current viewport is sent), during viewport switching, the server sometimes would have to continue sending video data that is from the video stream of a highest quality and that is covering only the old viewport or part thereof, to be prepared such that the user can at least see the lowest-quality video in case the user turns back to the old viewport or part thereof.

Two schemes are possible based on the SHVC codec for this viewport dependent video coding, including ScaLable coding based Partial Decoding (SLPD) #1 and SLPD #2. In SLDP #1, the 360-degree video is scalable-coded using SHVC spatial scalability with multiple qualities (e.g., resolution, bitrate, frame rate, or other quality). The bitstream of the lowest quality video (referred to as the base layer (BL), which can have, for example, the lowest resolution, bitrate, frame rate, or other quality) is always fully sent for decoding and playing, such that at any time and for any viewport, at least the lowest quality video is available for rendering. The lowest quality video does not need to be coded using tiles at all, although the system would work if the lowest quality video is coded using tiles or motion-constrained tiles.

In SLPD #1, one or more bitstreams of higher quality video than the base layer (referred to as enhancement layers, which can have, for example, increasingly higher resolution, bitrate, frame rate, or other quality as compared to the base layer) can also be coded. The enhancement layers (ELs) are coded using motion-constrained tiles such that each potential region covering a viewport can be independently decoded from other regions across time, with inter-layer prediction (ILP) being enabled. For a particular current viewport, the minimum set of tiles that cover the viewport is sent to the client device, and can then be decoded and rendered by the client device. From the storage point of view (on the encoder side device), the full streams of all the qualities/layers need to be stored.

When more than two layers are coded, tiles covering different viewports can be chosen from different qualities (e.g., resolutions, bitrates, frame rates, or a combination thereof)). For instance, for a current viewport (currently being rendered and viewed using a client device), the tiles can be chosen from the highest quality; for viewports neighboring to the current viewport, tiles can be chosen from the second highest quality; and so on.

Figure 9:
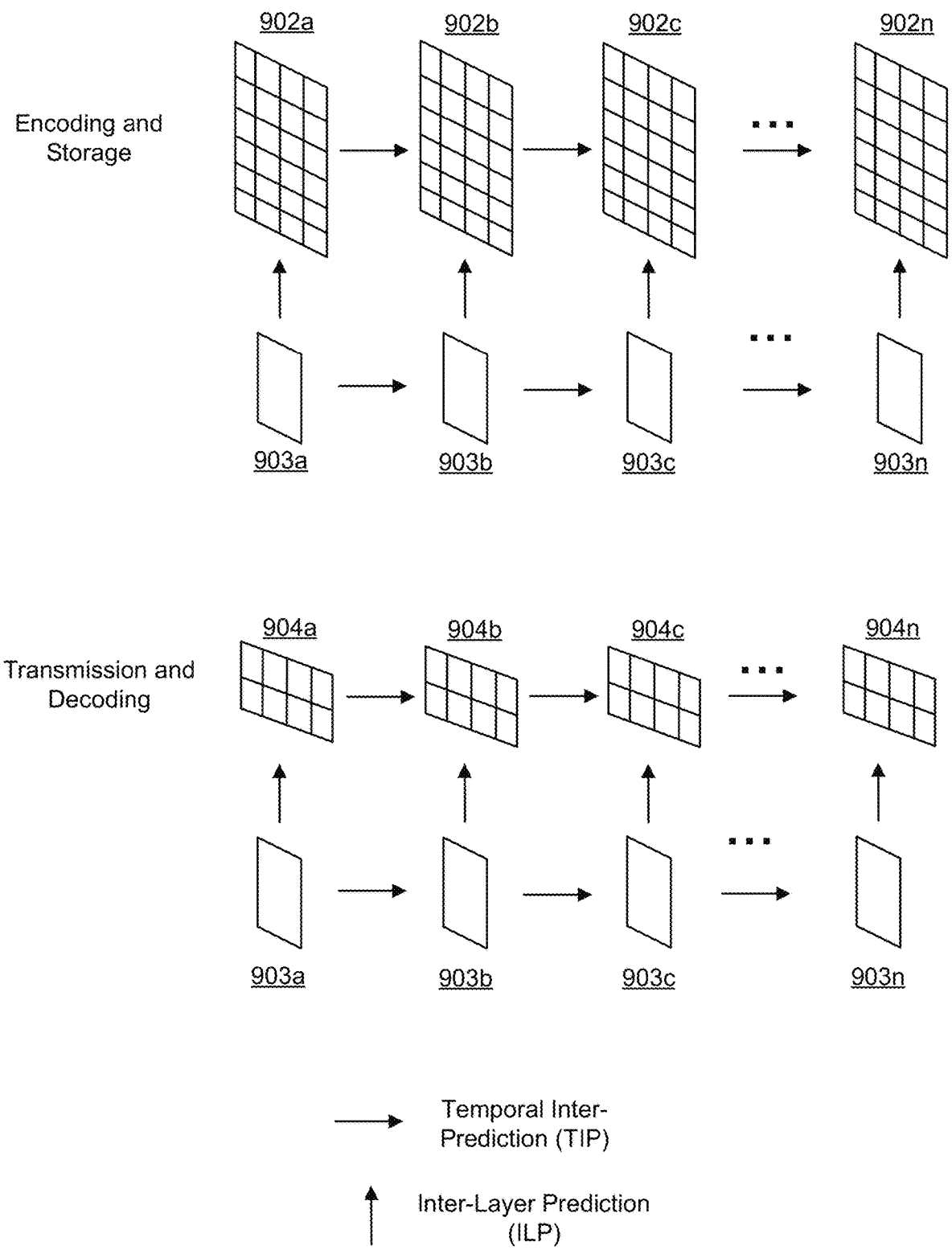
FIG. 9 is a diagram illustrating a first scalable coding based 360-degree video partial decoding, in accordance with some examples.

FIG. 9 is a diagram illustrating the first scalable coding based 360-degree video partial decoding technique (SLDP #1). Using SLDP #1, the full pictures 903a, 903b, 903c through 903n of a lowest quality layer of a video sequence (e.g., a video segment of a video representation) are encoded and stored at an encoding device or other transmitter-side device. The lowest quality layer can be referred to as a base layer, which can have, for example, the lowest resolution, bitrate, frame rate, or other quality of all layers of the video sequence. The full pictures 902a, 902b, 902c through 902n of an enhancement layer of the video sequence are also encoded and stored at an encoding device or other transmitter-side device. In SLDP #1, the full pictures 902a, 902b, 902c through 902n of the enhancement layer are divided into motion-constrained tiles, while the full pictures 903a, 903b, 903c through 903n of the base layer are not divided into tiles. Each of the full pictures 902a, 902b, 902c through 902n have 24 motion-constrained tiles, with each tile having a corresponding location in each picture, as described in more detail below with respect to FIG. 13.

As shown in FIG. 9, temporal inter-prediction can be performed to encode the full pictures 902a, 902b, 902c through 902n using one or more of the full pictures 902a, 902b, 902c through 902n as reference pictures. Temporal inter-prediction can also be performed to encode the full pictures 903a, 903b, 903c through 903n using one or more of the full pictures 903a, 903b, 903c through 903n as reference pictures. Further, inter-layer prediction can be performed to encode the full pictures 902a, 902b, 902c through 902n of the enhancement layer using one or more of the full pictures 903a, 903b, 903c through 903n of the base layer as reference pictures.

Only the portion of tiles from the full pictures 902a, 902b, 902c through 902n that cover the current viewport are transmitted to and decoded by a client device (e.g., a VR headset, a mobile device, or other suitable 360-degree enabled viewing device). For example, the partial pictures 904a, 904b, 904c through 904n include the tiles of the enhancement layer pictures necessary to decode the portion of the full pictures 902a, 902b, 902c through 902n that correspond to the current viewport being viewed by a user of the client device. As shown, the full pictures 903a, 903b, 903c through 903n of the base layer are transmitted to and decoded by the client device. Using such a technique, the lowest quality video pictures are always provided to the player device (or other client device), so that when a user turns their head and/or device, the player device can render at least a low quality version of the new viewport until a higher quality version of the video data of the viewport can be transmitted to the player device for decoding and rendering.

As shown in FIG. 9, temporal inter-prediction can be performed to decode the partial pictures 904a, 904b, 904c through 904n using one or more of the partial pictures 904a, 904b, 904c through 904n as reference pictures. Temporal inter-prediction can also be performed to decode the full pictures 903a, 903b, 903c through 903n using one or more of the full pictures 903a, 903b, 903c through 903n as reference pictures. Inter-layer prediction can also be performed to decode the partial pictures 904a, 904b, 904c through 904n from the enhancement layer using one or more of the full pictures 903a, 903b, 903c through 903n from the base layer as reference pictures.

In SLDP #2, the 360-degree (or VR) video is also scalable-coded using SHVC spatial scalability with multiple qualities. The base layer is coded the same as in SLPD #1, while the one or more enhancement layers are coded similarly as in SLPD #1 but with temporal inter prediction (TIP) disabled. The TIP used in SLPD #1 can cause delays because, in which case switching from displaying video data from a first set of tiles (for a first viewport) to a second set of tiles (for a second viewport) can be delayed. For example, the tiles of a picture need to be sent for a random access picture and all pictures depending from the random access picture. In some cases, random access pictures occur in a bitstream at long durations (e.g., 1 random access picture every 1 second, 2 seconds, or the like), which can lead to delay. Such a delay can lead to a poor user experience. Because the TIP between the pictures of the enhancement layer is eliminated, the enhancement layer pictures can be predicted using pictures from the base layer as reference pictures (using inter-layer prediction).

Figure 10:
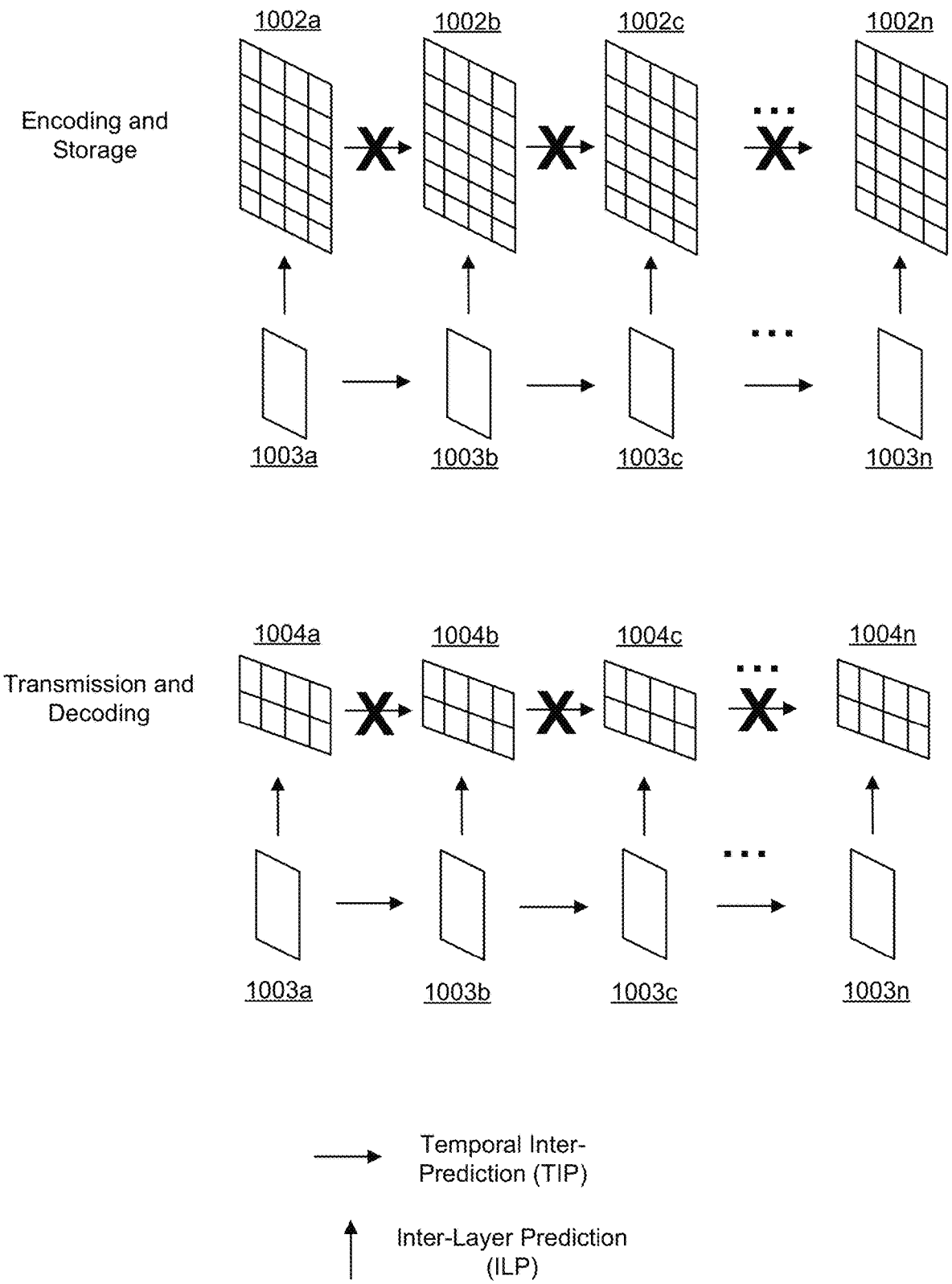
FIG. 10 is a diagram illustrating a second scalable coding based 360-degree video partial decoding, in accordance with some examples.

FIG. 10 is a diagram illustrating the second scalable coding based 360-degree video partial decoding technique (SLDP #2). Using SLDP #2, the full pictures 1003a, 1003b, 1003c through 1003n of a lowest quality layer of a video sequence (e.g., a video segment of a video representation) are encoded and stored at an encoding device or other transmitter-side device. The lowest quality layer can be referred to as a base layer, which can have, for example, the lowest resolution, bitrate, frame rate, or other quality of all layers of the video sequence. The full pictures 1002a, 1002b, 1002c through 1002n of an enhancement layer of the video sequence are also encoded and stored at an encoding device or other transmitter-side device. Similar to SLDP #1, in SLDP #2, the full pictures 1002a, 1002b, 1002c through 1002n of the enhancement layer are divided into motion-constrained tiles, while the full pictures 1003a, 1003b, 1003c through 1003n of the base layer are not divided into tiles. Each of the full pictures 1002a, 1002b, 1002c through 1002n have 24 motion-constrained tiles, with each tile having a corresponding location in each picture, as described in more detail below with respect to FIG. 13.

As shown in FIG. 10, temporal inter-prediction is disabled (as denoted by the arrow with an "X" thereover in the figure) for encoding the full pictures 1002a, 1002b, 1002c through 1002n using one or more of the full pictures 1002a, 1002b, 1002c through 1002n as reference pictures. Temporal inter-prediction can be performed to encode the full pictures 1003a, 1003b, 1003c through 1003n of the base layer using one or more of the full pictures 1003*a*, 1003*b*, 1003*c* through 1003*n* as reference pictures. To encode the full pictures 1002*a*, 1002*b*, 1002*c* through 1002*n* from the enhancement layer, inter-layer prediction can be performed using one or more of the full pictures 1003*a*, 1003*b*, 1003*c* through 1003*n* from the base layer as reference pictures.

Only the portion of tiles from the full pictures 1002*a*, 1002*b*, 1002*c* through 1002*n* of the enhancement layer that cover the current viewport are transmitted to and decoded by a client device (e.g., a VR headset, a mobile device, or other suitable 360-degree enabled viewing device). For example, the partial pictures 1004*a*, 1004*b*, 1004*c* through 1004*n* include the tiles of the enhancement layer pictures necessary to decode the portion of the full pictures 1002*a*, 1002*b*, 1002*c* through 1002*n* that correspond to the current viewport being viewed by a user of the client device. The full pictures 1003*a*, 1003*b*, 1003*c* through 1003*n* of the base layer are transmitted to and decoded by the client device. Similar to SLDP #1, the lowest quality video pictures are always provided to the player device (or other client device), so that when a user adjusts their head position and/or device, the player device can render at least a low quality version of the new viewport until a higher quality version of the video data of the viewport can be transmitted to the player device for decoding and rendering.

As shown in FIG. 10, temporal inter-prediction is disabled for decoding the partial pictures 1004*a*, 1004*b*, 1004*c* through 1004*n*. Temporal inter-prediction can be performed to decode the full pictures 1003*a*, 1003*b*, 1003*c* through 1003*n* of the base layer using one or more of the full pictures 1003*a*, 1003*b*, 1003*c* through 1003*n* as reference pictures. Inter-layer prediction can be performed to decode the partial pictures 1004*a*, 1004*b*, 1004*c* through 1004*n* of the enhancement layer using one or more of the full pictures 1003*a*, 1003*b*, 1003*c* through 1003*n* of the base layer as reference pictures.

Another example of viewport dependent video coding is referred to herein as independent multi-resolution coding (IMRC) (also referred as SiMulcast coding based Partial Decoding (SMPD)). Using the SMPD technique, the spherical, panorama, or other video is encoded at multiple different resolutions (and/or other qualities, such as bitrate and/or frame rate) that are independent of each other, and each representation (of the different resolutions and/or other qualities) is coded using a motion-constrained sets of tiles. The receiver chooses to decode different portions of the spherical, panorama, or other type of video at the different qualities. For example, the portion of the spherical video (or other formatted video) that is being currently observed by the user (the current viewport or FOV) is part of the video bitstream coded at the highest resolution (and/or other quality). The region surrounding the current FOV is part of the video bitstream coded using a slightly lower resolution (and/or other quality), and so on. The portion of the panorama directly behind the user's head is part of the video bitstream coded at the lowest resolution (and/or other quality). In some instances, in case of a head movement by the user, the user experience will degrade only by a small amount in most cases, and the quality degradation being most severe occurs only in the case of a very large sudden head movement.

Figure 11:
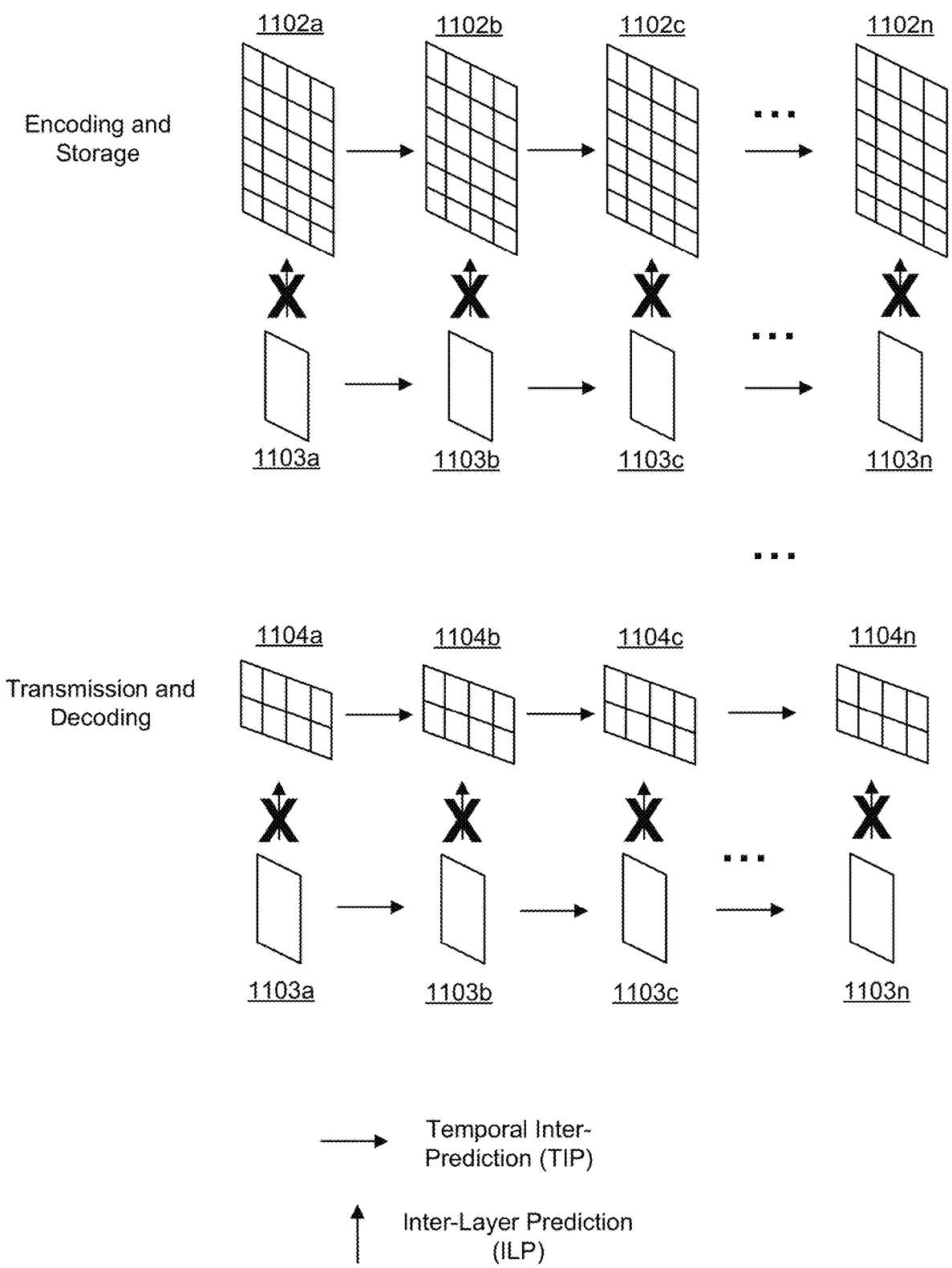
FIG. 11 is a diagram illustrating a first simulcast coding based 360-degree video partial decoding, in accordance with some examples.

Two variations of SMPD schemes can be performed, including SMPD #1 and SMPD #2. FIG. 11 is a diagram illustrating the first simulcast coding based VR video partial decoding technique (SMPD #1). SMPD #1 is the same as SLPD #1, except that inter-layer prediction is not used (as denoted by the arrow with an "X" thereover in the figure).

As shown in FIG. 11, the full pictures 1103*a*, 1103*b*, 1103*c* through 1103*n* of a base layer of a video sequence (e.g., a video segment of a video representation) are encoded and stored at an encoding device or other transmitter-side device. The base layer can have, for example, the lowest resolution, bitrate, frame rate, or other quality of all layers of the video sequence. The full pictures 1102*a*, 1102*b*, 1102*c* through 1102*n* of an enhancement layer of the video sequence are also encoded and stored at an encoding device or other transmitter-side device. In SMDP #1, the full pictures 1102*a*, 1102*b*, 1102*c* through 1102*n* of the enhancement layer are divided into motion-constrained tiles, while the full pictures 1103*a*, 1103*b*, 1103*c* through 1103*n* of the base layer are not divided into tiles. Each of the full pictures 1102*a*, 1102*b*, 1102*c* through 1102*n* have 24 motion-constrained tiles, with each tile having a corresponding location in each picture, as described in more detail below with respect to FIG. 13.

As shown in FIG. 11, temporal inter-prediction can be performed to encode the full pictures 1102*a*, 1102*b*, 1102*c* through 1102*n* of the enhancement layer using one or more of the full pictures 1102*a*, 1102*b*, 1102*c* through 1102*n* as reference pictures. Temporal inter-prediction can also be performed to encode the full pictures 1103*a*, 1103*b*, 1103*c* through 1103*n* of the base layer using one or more of the full pictures 1103*a*, 1103*b*, 1103*c* through 1103*n* as reference pictures. As shown, inter-layer prediction is disabled for encoding the full pictures 1102*a*, 1102*b*, 1102*c* through 1102*n* of the enhancement layer.

Only the tiles from the full pictures 1102*a*, 1102*b*, 1102*c* through 1102*n* that cover the current viewport are transmitted to and decoded by a client device (e.g., a VR headset, a mobile device, or other suitable 360-degree enabled viewing device). For example, the partial pictures 1104*a*, 1104*b*, 1104*c* through 1104*n* include the tiles of the pictures of the enhancement layer that are necessary to decode the portion of the full pictures 1102*a*, 1102*b*, 1102*c* through 1102*n* that correspond to the current viewport being viewed by a user of the client device. The full pictures 1103*a*, 1103*b*, 1103*c* through 1103*n* of the base layer are transmitted to and decoded by the client device.

As shown in FIG. 11, temporal inter-prediction can be performed to decode the partial pictures 1104*a*, 1104*b*, 1104*c* through 1104*n* using one or more of the partial pictures 1104*a*, 1104*b*, 1104*c* through 1104*n* as reference pictures. Temporal inter-prediction can also be performed to decode the full pictures 1103*a*, 1103*b*, 1103*c* through 1103*n* using one or more of the full pictures 1103*a*, 1103*b*, 1103*c* through 1103*n* as reference pictures. Inter-layer prediction is disabled (as denoted by the arrow with an "X" thereover in the figure) for decoding the partial pictures 1104*a*, 1104*b*, 1104*c* through 1104*n* from the enhancement layer using one or more of the full pictures 1103*a*, 1103*b*, 1103*c* through 1103*n* from the base layer as reference pictures.

Figure 12:
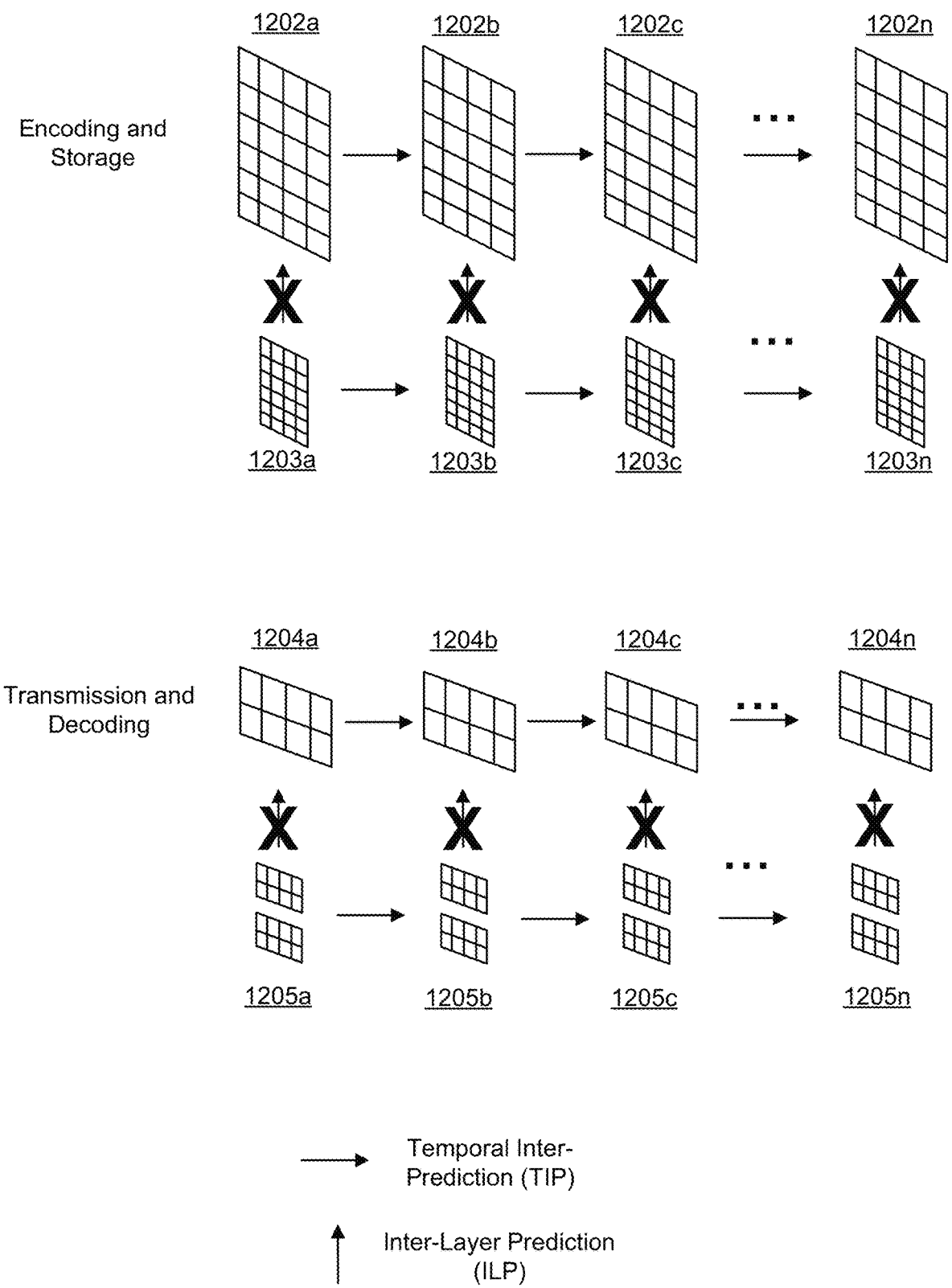
FIG. 12 is a diagram illustrating a second simulcast coding based 360-degree video partial decoding, in accordance with some examples.

FIG. 12 is a diagram illustrating the second simulcast coding based VR video partial decoding technique (SMPD #2). There are two differences between SMPD #2 and SMPD #1, including: 1) In SMPD #2, the lowest quality (e.g., resolution, bitrate, and/or frame rate) is also coded using motion-constrained tiles that are the same as the tiles of the one or more enhancement layers; and 2) When SMPD #2 is used, the lowest quality is also not fully sent, but only the tiles that cover the viewport that is geometrically the most distant from the current viewport and any other viewports not covered by sent tiles from other qualities.

As shown in FIG. 12, the full pictures 1203*a*, 1203*b*, 1203*c* through 1203*n* of a base layer of a video sequence (e.g., a video segment of a video representation) are encoded and stored at an encoding device or other transmitter-side device. The base layer can have, for example, the lowest resolution, bitrate, frame rate, or other quality of all layers of the video sequence. The full pictures 1202a, 1202b, 1202c through 1202n of an enhancement layer of the video sequence are also encoded and stored at an encoding device or other transmitter-side device. In SMDP #2, the full pictures 1203a, 1203b, 1203c through 1203n of the base layer are divided into motion-constrained tiles. The full pictures 1202a, 1202b, 1202c through 1202n of the enhancement layer are also divided into motion-constrained tiles. Each of the full pictures 1203a, 1203b, 1203c through 1203n and the full pictures 1202a, 1202b, 1202c through 1202n have 24 motion-constrained tiles, with each tile having a corresponding location in each picture, as described in more detail below with respect to FIG. 13.

As shown in FIG. 12, temporal inter-prediction can be performed to encode the full pictures 1202a, 1202b, 1202c through 1202n of the enhancement layer using one or more of the full pictures 1202a, 1202b, 1202c through 1202n as reference pictures. Temporal inter-prediction can also be performed to encode the full pictures 1203a, 1203b, 1203c through 1203n of the base layer using one or more of the full pictures 1203a, 1203b, 1203c through 1203n as reference pictures. Inter-layer prediction is disabled (as denoted by the arrow with an "X" thereover in the figure) for encoding the full pictures 1202a, 1202b, 1202c through 1202n of the enhancement layer.

Only the tiles from the full pictures 1202a, 1202b, 1202c through 1202n from the enhancement layer that cover the current viewport are transmitted to and decoded by a client device (e.g., a VR headset, a mobile device, or other suitable 360-degree enabled viewing device). For example, the partial pictures 1204a, 1204b, 1204c through 1204n include the tiles of the pictures of the enhancement layer that are necessary to decode the portion of the full pictures 1202a, 1202b, 1202c through 1202n that correspond to the current viewport being viewed by a user of the client device. Only the tiles from the full pictures 1203a, 1203b, 1203c through 1203n from the base layer that cover the current viewport are transmitted to and decoded by the client device. For example, the partial pictures 1205a, 1205b, 1205c through 1205n include the tiles of the pictures of the base layer that are necessary to decode the portion of the full pictures 1203a, 1203b, 1203c through 1203n that correspond to the current viewport being viewed by a user of the client device.

As shown in FIG. 12, temporal inter-prediction can be performed to decode the partial pictures 1204a, 1204b, 1204c through 1204n using one or more of the partial pictures 1204a, 1204b, 1204c through 1204n as reference pictures. Temporal inter-prediction can also be performed to decode the partial pictures 1205a, 1205b, 1205c through 1205n of the base layer using one or more of the partial pictures 1205a, 1205b, 1205c through 1203n as reference pictures. Inter-layer prediction is disabled for decoding the partial pictures 1204a, 1204b, 1204c through 1204n from the enhancement layer using one or more of the partial pictures 1205a, 1205b, 1205c through 1205n from the base layer as reference pictures.

Figure 13:
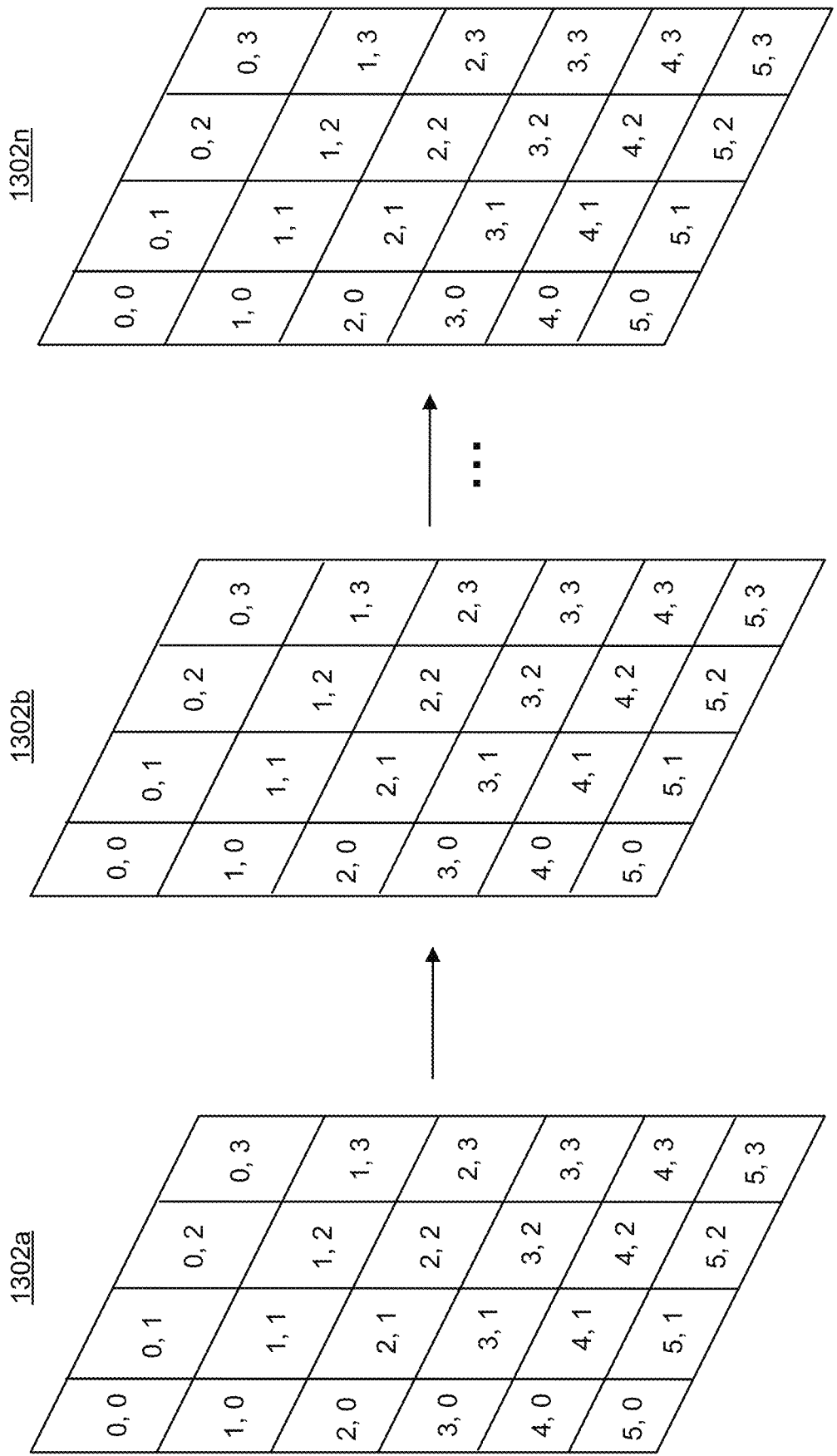
FIG. 13 is a diagram illustrating tile based video pictures, in accordance with some examples.

FIG. 13 is a diagram illustrating tile based video pictures 1302a, 1302b through 1302n. The pictures 1302a, 1302b through 1302n can include any number of pictures, and can be associated with a certain period within a video file. For example, the period can include minute 3:00 through minute 10:00 of a movie file. The pictures 1302a, 1302b through 1302n can be part of a base layer (e.g., in SMPD #2) or part of an enhancement layer (e.g., in any of SLPD #1, SLPD #2, SMPD #1, or SMPD #2). The tiles in the pictures 1302a, 1302b through 1302n are motion-constrained tiles, such that all pictures in a layer have the same tile structure. In such cases, the tiles have the same location across all frames of a given layer of the bitstream. For example, as shown, each tile has a designated location across the different pictures 1302a, 1302b through 1302n. In one example, a first tile has a location of (0, 0) in the 1302a, 1302b through 1302n. In some cases, the tiles can be numbered, such as tile numbers 0-23, tile numbers 1-24, or other suitable numbering. As shown in FIG. 13, the tiles do not overlap with one another.

Temporal inter-prediction can be performed in a tile-based manner. For example, a motion-constrained tile at a particular location in a picture can only be coded using one or more tiles at the same location in other pictures. Only the region of a reference picture that is within the particular tile location can be used to encode or decode the tile at that location in a current picture. For example, the tiles at a location (0, 0) in the pictures 1302a, 1302b through 1302n can only use other tiles at the location (0, 0) in other pictures as reference for inter-prediction. Using such a technique, reference tiles will be available even when only a portion of the tiles are transmitted to a client device for decoding and rendering of a particular viewport.

Generation and use of information related to most interested regions can also be used to enhance 360-degree video systems. Generation and signaling of information related to most interested regions can be performed using user-provided input, based on user statistics by a service or content provider, or using other suitable techniques. In some examples, a creator of the content (e.g., a director, a producer, an author, or the like) can define the most interested regions in a video. In some examples, most interested regions can be determined using the statistics of which regions have been requested and/or seen the most by users when certain 360-degree (or VR) video content was provided through a streaming service. A most interested region in a 360-degree video picture can include one of the regions that are statistically most likely to be rendered to the user at the presentation time of the picture.

Information on most interested regions can be used for various 360-degree video performance-improving purposes. For example, most interested region information can be used for data pre-fetching in 360-degree video adaptive streaming by edge servers or clients. In another example, most interested region information can be used for transcoding optimization when a VR video is transcoded (e.g., to a different codec, to a different projection mapping, or other transcoding operation). In other examples, most interested region information can be used for cache management by an edge server or cache, content management by a 360-degree video streaming server, or other purposes. In some cases, signaling of most interested regions can be performed, for example, by using SEI messages in a video bitstream, a file format sample group in a media file, or dynamic adaptive streaming over HTTP (DASH) media presentation description (MPD) elements or attributes using a sample group.

Various problems are encountered when performing the viewport dependent video coding and most interested region techniques described above. In some cases, problems exist with respect to DASH signaling (or other streaming-based signaling) to support partial decoding of 360-degree (or VR) video. For example, there is currently no signaling mechanism to describe DASH content in a media presentation description (MPD) for video that is stored in ISOBMFF using tile tracks as defined in ISO/IEC 14496-15 clause 10. When a 360-degree (or VR) video picture is coded into multiple tiles and each tile is encapsulated into one DASH representation, there is no mechanism to relate all the representations containing the tiles that make up the complete 360-degree video picture.

In some cases, problems also exist with respect to current DASH signaling (or other streaming-based signaling) for most interested regions. For example, existing designs for signaling of information on most interested regions of 360-degree (or VR) video has problems such that no mechanism was available to ensure that information on most interested regions of 360-degree video can be received by an adaptive streaming client or edge server before the video pictures that the information is about are received. To achieve this, as described in more detail below, the most interested region information can be signaled in an MPD (or other suitable file) so that a DASH client (or other streaming-based client) can receive the region information in advance. The client can parse the information in the MPD (or other file), and use the most interested region information when making a decision of which information to request from the streaming server.

Systems and methods are described herein for providing advanced signaling of information for viewport dependent video coding and/information for one or more most interested regions in 360-degree video. For example, the information related to the most interested regions of VR video can be received by an adaptive streaming client or edge server before the video pictures that the information is related to. One or more of the methods described herein may be applied independently, or in combination with others.

In some examples, to support tile based viewport dependent partial 360-degree video encoding and decoding schemes in DASH (as well as in other streaming-based systems, such as HTTP Live Streaming (HLS)), media files can be generated to include information related to tile based viewport dependent partial 360-degree video content. The media files can include any suitable streaming media file, such as a media presentation description (MPD) used for DASH content. The file can include any other suitable file for other streaming-based systems, such as one or more playlist files for an HLS system.

As described above, the viewport dependent video coded content can be encoded by dividing the pictures of a video stream into motion-constrained tiles. In some cases, the pictures of an enhancement layer of the video content can be divided into tiles. In some cases, the pictures of a base layer of the video content can also be divided into tiles. The video content can include a movie, a television show, a home video, or any other suitable video content. Only the tiles of the pictures that are required to display a current viewport being rendered by a client device can be provided to the client device.

In some examples, tile representations can be generated for inclusion in a media file. For example, each track carrying a motion-constrained tile can be encapsulated into one DASH representation. Such a representation is called a tile representation. For example, the video can be stored in an ISO Base Media Format File (ISOBMFF) using tile tracks as defined in ISO/IEC 14496-15 clause 10. For example, a video bitstream encoded as discussed above can be written or packed into one or more files using the ISOBMFF, a file format derived from the ISOBMFF, some other file format, and/or a combination of file formats including the ISOBMFF. The file or files can be played back using a video player device, can be transmitted and then displayed, and/or be stored. For example, the files can be signaled using DASH signaling, or other streaming-based signaling.

Figure 14:
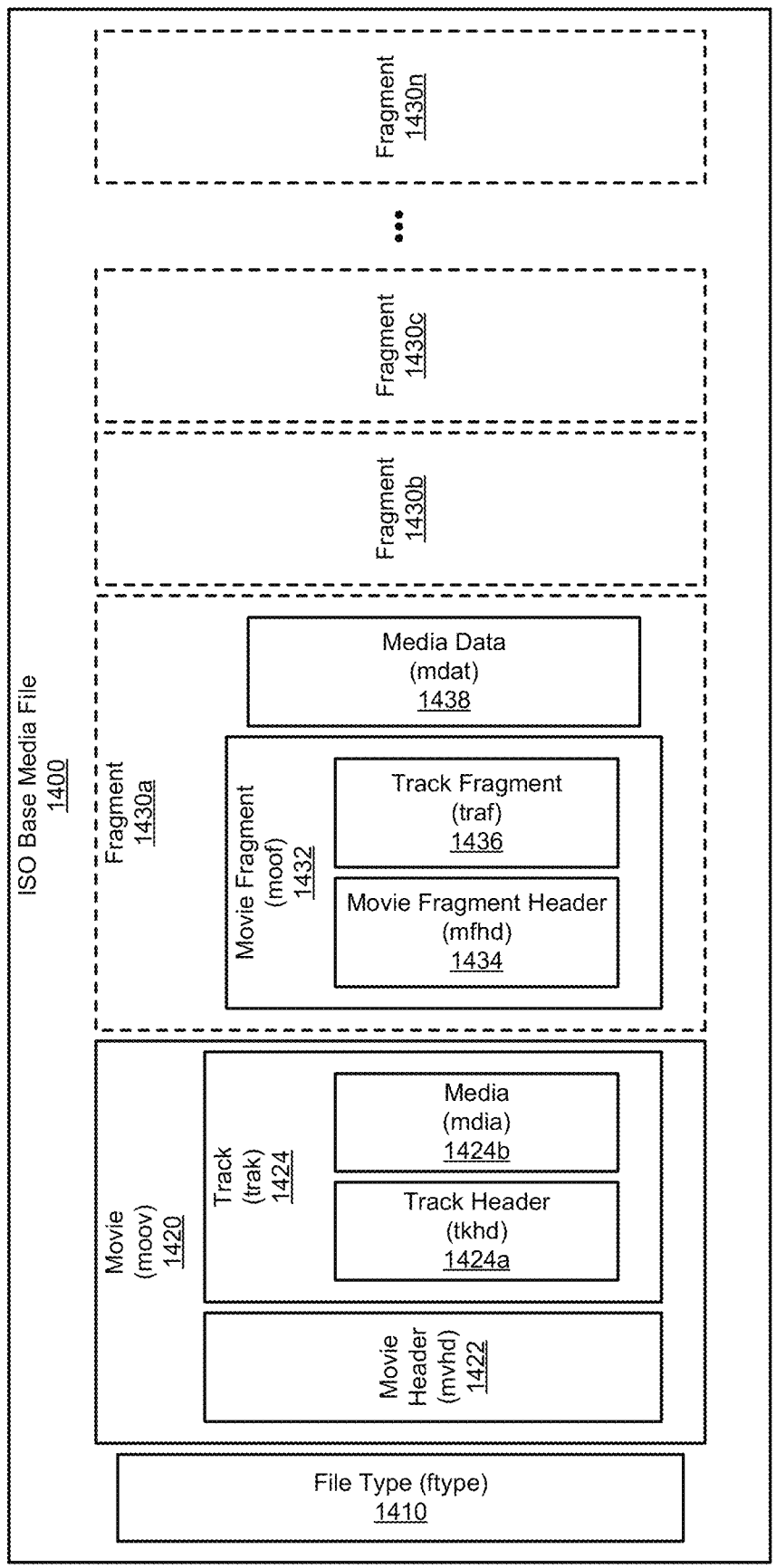
FIG. 14 is a diagram illustrating an example of an ISO base media file that contains data and metadata for a video presentation, in accordance with some examples.

FIG. 14 includes an example of an ISO base media file 1400 that contains data and metadata for a video presentation, formatted according to the ISOBMFF. The ISOBMFF is designed to contain timed media information in a flexible and extensible format that facilitates interchange, management, editing, and presentation of the media. Presentation of the media may be "local" to the system containing the presentation or the presentation may be via a network or other stream delivery mechanism.

A "presentation," as defined by the ISOBMFF specification, is a sequence of pictures, often related by having been captured sequentially by a video capture device, or related for some other reason. Herein, a presentation may also be referred to as a movie or a video presentation. In some cases, a presentation may include audio. A single presentation may be contained in one or more files, with one file containing the metadata for the whole presentation. The metadata includes information such as timing and framing data, descriptors, pointers, parameters, and other information that describes the presentation. Metadata does not include the video and/or audio data itself. Files other than the file that contains the metadata need not be formatted according to the ISOBMFF, and need only be formatted such that these files can be referenced by the metadata.

The file structure of an ISO base media file is object-oriented, and the structure of an individual object in the file can be inferred directly from the object's type. The objects in an ISO base media file are referred to as "boxes" by the ISOBMFF specification. An ISO base media file is structured as a sequence of boxes, which can contain other boxes. Boxes generally include a header that provides a size and a type for the box. The size describes the entire size of the box, including the header, fields, and all boxes contained within the box. Boxes with a type that is not recognized by a player device are typically ignored and skipped.

As illustrated by the example of FIG. 14, an ISO base media file 1400 can include, at the top level of the file, a file type box 1410, a movie box 1420, and one or more movie fragment boxes 1430a through 1430n. Other boxes that can be included at this level, but that are not represented in this example, include free space boxes, metadata boxes, and media data boxes, among others.

The file type box 1410 can be identified by the box type "ftyp." The file type box 1410 identifies an ISOBMFF specification that is the most suitable for parsing the file. "Most" in this instance means that the ISO base media file 1400 may have been formatted according to a particular ISOBMFF specification, but is likely compatible with other iterations of the specification. This most suitable specification is referred to as the major brand. A player device can use the major brand to determine whether the device is capable of decoding and displaying the contents of the file. The file type box 1410 can also include a version number, which can be used to indicate a version of the ISOBMFF specification. The file type box 1410 can also include a list of compatible brands, which includes a list of others brands with which the file is compatible. An ISO base media file can be compatible with more than one major brand.

When an ISO base media file 1400 includes a file type box 1410, there is only one file type box. An ISO base media file 1400 may omit the file type box 1410 in order to be compatible with older player devices. When an ISO base media file 1400 does not include a file type box 1410, a player device can assume a default major brand (e.g.

"mp41"), minor version (e.g., "0"), and compatible brand (e.g., "mp41"). The file type box 1410 is typically placed as early as possible in the ISO base media file 1400.

An ISO base media file can further include a movie box 1420, which contains the metadata for the presentation. The movie box 1420 is identified by the box type "moov." ISO/IEC 14496-12 provides that a presentation, whether contained in one file or multiple files, can include only one movie box 1420. Frequently, the movie box 1420 is near the beginning of an ISO base media file. The movie box 1420 includes a movie header box 1422, and can include one or more track boxes 1424 as well as other boxes.

The movie header box 1422, identified by the box type "mvhd," can include information that is media-independent and relevant to the presentation as a whole. For example, the movie header box 1422 can include information such as a creation time, a modification time, a timescale, and/or a duration for the presentation, among other things. The movie header box 1422 can also include an identifier that identifies the next track in the presentation. For example, the identifier can point to the track box 1424 contained by the movie box 1420 in the illustrated example.

The track box 1424, identified by the box type "trak," can contain the information for a track for a presentation. A presentation can include one or more tracks, where each track is independent of other tracks in the presentation. Each track can include the temporal and spatial information that is specific to the content in the track, and each track can be associated with a media box. The data in a track can be media data, in which case the track is a media track, or the data can be packetization information for streaming protocols, in which case the track is a hint track. Media data includes, for example, video and audio data. In the illustrated example, the example track box 1424 includes a track header box 1424a and a media box 1424b. A track box can include other boxes, such as a track reference box, a track group box, an edit box, a user data box, a meta box, and others.

The track header box 1424a, identified by the box type "tkhd," can specify the characteristics of a track contained in the track box 1424. For example, the track header box 1424a can include a creation time, modification time, duration, track identifier, layer identifier, group identifier, volume, width, and/or height of the track, among other things. For a media track, the track header box 1424a can further identify whether the track is enabled, whether the track should be played as part of the presentation, or whether the track can be used to preview the presentation, among other things. Presentation of a track is generally assumed to be at the beginning of a presentation. The track box 1424 can include an edit list box, not illustrated here, that can include an explicit timeline map. The timeline map can specify, among other things, an offset time for the track, where the offset indicates a start time, after the beginning of the presentation, for the track.

In the illustrated example, the track box 1424 also includes a media box 1424b, identified by the box type "mdia." The media box 1424b can contain the objects and information about the media data in the track. For example, the media box 1424b can contain a handler reference box, which can identify the media type of the track and the process by which the media in the track is presented. As another example, the media box 1424b can contain a media information box, which can specify the characteristics of the media in the track. The media information box can further include a table of samples, where each sample describes a chunk of media data (e.g., video or audio data) including, for example, the location of the data for the sample. The data for a sample is stored in a media data box, discussed further below. As with most other boxes, the media box 1424b can also include a media header box.

In the illustrated example, the example ISO base media file 1400 also includes multiple fragments 1430a, 1430b, 1430c, 1430n of the presentation. The fragments 1430a, 1430b, 1403c, 1430n are not ISOBMFF boxes, but rather describe a movie fragment box 1432 and the media data box 1438 that is referenced by the movie fragment box 1432. The movie fragment box 1432 and media data boxes 1438 are top-level boxes, but are grouped here to indicate the relationship between a movie fragment box 1432 and a media data box 1438.

A movie fragment box 1432, identified by the box type "moof," can extend a presentation by including additional information that would otherwise be stored in the movie box 1420. Using movie fragment boxes 1432, a presentation can be built incrementally. A movie fragment box 1432 can include a movie fragment header box 1434 and a track fragment box 1436, as well as other boxes not illustrated here.

The movie fragment header box 1434, identified by the box type "mfhd," can include a sequence number. A player device can use the sequence number to verify that the fragment 1430a includes the next piece of data for the presentation. In some cases, the contents of a file, or the files for a presentation, can be provided to a player device out of order. For example, network packets can frequently arrive in an order other than in the order that the packets were originally transmitted. In these cases, the sequence number can assist a player device in determining the correct order for fragments.

The movie fragment box 1432 can also include one or more track fragment boxes 1436, identified by the box type "traf." A movie fragment box 1432 can include a set of track fragments, zero or more per track. The track fragments can contain zero or more track runs, each of which describes a contiguous run of samples for a track. Track fragments can be used to add empty time to a track, in addition to adding samples to the track.

The media data box 1438, identified by the box type "mdat," contains media data. In video tracks, the media data box 1438 would contain video frames. A media data box can alternatively or additionally include audio data. A presentation can include zero or more media data boxes, contained in one or more individual files. The media data is described by metadata. In the illustrated example, the media data in the media data box 1438 can be described by metadata included in the track fragment box 1436. In other examples, the media data in a media data box can be described by metadata in the movie box 1420. The metadata can refer to particular media data by an absolute offset within the file 1400, such that a media data header and/or free space within the media data box 1438 can be skipped.

Other fragments 1430b, 1430c, 1430n in the ISO base media file 1400 can contain boxes similar to those illustrated for the first fragment 1430a, and/or can contain other boxes.

The ISOBMFF includes support for streaming media data over a network, in addition to supporting local playback of the media. The file or files that include one movie presentation can include additional tracks, called hint tracks, which contain instructions that can assist a streaming server in forming and transmitting the file or files as packets. These instructions can include, for example, data for the server to send (e.g., header information) or references to segments of the media data. A file can include separate hint tracks for different streaming protocols. Hint tracks can also be added to a file without needing to reformat the file.

As described previously, one method for streaming media data is DASH, which is an adaptive bitrate streaming technique that enables high quality streaming of media content using conventional HTTP web servers. DASH operates by breaking the media content into a sequence of small HTTP-based file segments, where each segment contains a short time interval of the content. Using DASH, a server can provide the media content at different bitrates. A client device that is playing the media can select among the alternative bitrates (e.g., alternative representations of a media content item, such as a movie, a show, or other media content item) when downloading a next segment, and thus can adapt to changing network conditions. DASH uses the HTTP web server infrastructure of the Internet to deliver content over the World Wide Web. DASH is independent of the codec used to encode and decode the media content, and thus can operate with codecs such as H.264 and HEVC, among other codecs currently available or available in the future.

The ISOBMFF specification specifies six types of Stream Access Points (SAPs) for use with DASH. The first two SAP types (types 1 and 2) correspond to instantaneous decoding refresh (IDR) pictures in H.264/AVC and HEVC. For example, an IDR picture is an intra-picture (I-picture) that completely refreshes or reinitializes the decoding process at the decoder and starts a new coded video sequence. In some examples, an IDR picture and any picture following the IDR picture in decoding order cannot be dependent on any picture that comes before the IDR picture in decoding order.

The third SAP type (type 3) corresponds to open-GOP (Group of Pictures) random access points, hence broken link access (BLA) or clean random access (CRA) pictures in HEVC. For example, a CRA picture is also an I-picture. A CRA picture may not refresh the decoder and may not begin a new CVS, allowing leading pictures of the CRA picture to depend on pictures that come before the CRA picture in decoding order. Random access may be done at a CRA picture by decoding the CRA picture, leading pictures associated with the CRA picture that are not dependent on any picture coming before the CRA picture in decoding order, and all associated pictures that follow the CRA in both decoding and output order. In some cases, a CRA picture may not have associated leading pictures. In some embodiments, in the multi-layer case, an IDR or a CRA picture that belongs to a layer with layer ID greater than 0 may be a P-picture or a B-picture, but these pictures can only use inter-layer prediction from other pictures that belong to the same access unit as the IDR or CRA picture, and that have a layer ID less than the layer containing the IDR or CRA picture.

The fourth SAP type (type 4) corresponds to gradual decoding refresh (GDR) random access points.

As noted above, a representation (e.g., a DASH representation) called a tile representation can be generated for inclusion in a media file (e.g., in an MPD) to encapsulate a track carrying a motion-constrained tile of a video picture. For example, an ISOBMFF track can be encapsulated by a tile representation. The track can include a group of tiles at a specific tile location in the pictures of a 360-degree video stream. In one illustrative example, referring to FIG. 13, a total of 24 tile representations can be generated, with one tile representation being generated for each tile location. For instance, one tile representation in the file can include a track that includes all tiles at location (1, 0) in a group of pictures of a layer of the bitstream, and another tile representation can include a track that includes all tiles at location (1, 1) in the group of pictures.

An adaptation set can also be generated for the media file. All the representations for video bitstreams of different qualities (e.g. resolutions, bitrates, frame rates, or a combination thereof, such as those associated with different layers), and carrying different regions can be included in one adaptation set. For example, the adaptation set can include representations of the 360-degree video stream at different qualities (e.g., different layers) and carrying different viewports. The representations in the adaptation set can include the tile representations including the motion-constrained tiles of one or more enhancement layers. The representations in the adaptation set can also include the entire pictures of a base layer when the base layer is not divided into tiles. When the base layer is divided into tiles, the adaptation set can include the tile representations including the motion-constrained tiles of the pictures of the base layer.

In an adaptation set that contains the set of tile representations of different qualities, for each quality represented by multiple tile representations, one DASH representation that is associated with the complete VR video picture can be defined. Such a DASH representation is called a tile base representation. For example, a tile base representation can be generated for each quality (e.g., each different layer) in the adaptation set for inclusion in the media file. The tile base representation can encapsulate all motion-constrained tiles in the pictures for a given layer (having a certain resolution, bitrate, quality, or combination thereof).

Figure 15:
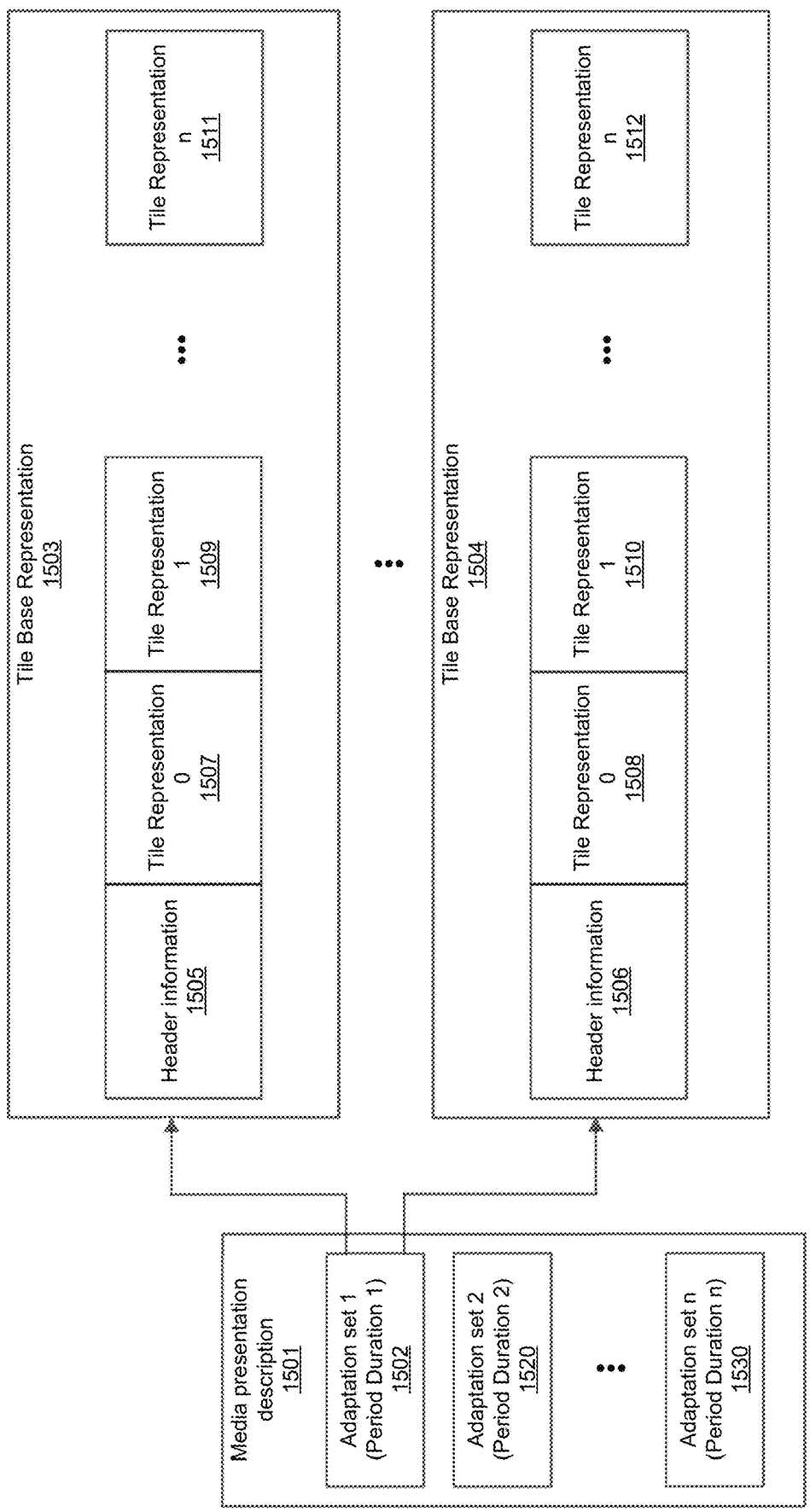
FIG. 15 provides a graphical representation of an example of an MPD file, in accordance with some examples.

FIG. 15 is a diagram illustrating an example of an MPD 1501. The MPD 1501 includes adaptation sets for each defined period duration in a media file (e.g., a movie file, a game file, or other type of media file). For example, an adaptation set 1 1502 is generated for a first period duration 1, an adaptation set 2 1520 is generated for a second period duration 2, and so on until adaptation set n is generated for a period duration n. The value of n can be any non-negative integer value. A period duration can include a time period, a period of bytes, or other suitable period duration.

The adaptation set 1 1502 is generated to include two tile base representations 1503 and 1504. In cases in which the pictures of the base layer are divided into tiles, the tile base representation 1504 can include tile representations of the tiles of the pictures from the base layer.

In other cases, when the pictures of the base layer are not divided into tiles, the tile base representation 1504 can include tile representations including the tiles of the pictures from a lowest quality enhancement layer. In such cases, when the base layer pictures are not divided into tiles, the adaptation set 1 1502 also includes a single representation (not shown) including the pictures of the base layer for the period duration 1. The tile base representation 1503 can include tile representations of the tiles of the pictures from an enhancement layer. Other representations (e.g., tile base representations or other suitable representations) can also be included in the adaptation set 1 1502. For example, additional tile base representations can be generated for the adaptation set 1 1502 based on the number of enhancement layers of different qualities (e.g., resolution, frame rate, or the like) that are available for the video content.

As shown in FIG. 15, the tile base representation 1503 includes tile representation 0 1507, tile representation 1 1509, through tile representation n 1511. Each tile representation encapsulates a track carrying motion-constrained tiles at a particular location in a certain period of a video file. The period can include a time period, such as the first five minutes of a movie file. In one example, referring to FIG. 13, the tile representation 0 1507 can include all tiles in the period of the video file that are at location (0, 0) in the pictures 1302*a*, 1302*b* through 1302*n*, the tile representation 1 1509 can include all tiles in the period of the video file that are at location (0, 1), and the tile representation n 1511 can include all tiles in the period of the video file that are at location (5, 3). In the example shown in FIG. 13, the tile base representation 1503 can also include 21 other tile representations for the other tile locations in the pictures 1302*a*, 1302*b* through 1302*n*.

The tile base representation 1504 includes tile representation 0 1508, tile representation 1 1510, through tile representation n 1512. Similar to the tile representations of tile base representation 1503, each tile representation in the tile base representation 1504 encapsulates a track carrying motion-constrained tiles at a particular location in a certain period of a video file.

The tile base representations 1503 and 1504 also include header information 1505 and 1506, respectively. The header information 1505, for example, can include elements, descriptors, or the like with information relating to the tile representation 0 1507, the tile representation 1 1509, through the tile representation n 1511. In one illustrative example, the header information 1505 can include timing or byte offset information indicating where a track or other video data is located in a video file.

In some examples, data can be generated for inclusion in the media file (e.g., in the MPD 1501), which can relate to a tile base representation and/or to an individual tile representation. For example, for a tile base representation, 360-degree video specific metadata (or VR specific metadata) can be generated and included in the media file. When present, the metadata is applicable to each complete 360-degree video picture in a particular portion of the video (e.g., a certain duration). For example, an EssentialProperty element may be present to describe information about projection types, viewpoint or FOV directions, region-wise mapping, or other information. A projection type indicates the method of projecting pixels (or pels) in a spherical space to a two-dimensional (2D) picture. Examples of projection types can include cubemap projection, truncated square pyramid projection, and/or other type of projection. Viewpoint (or FOV) direction information can indicate the direction of an area within the sphere (i.e., a subset of the sphere area) that is the focus of attention. Viewpoint (or FOV) direction information can also be defined as the direction of the area within the sphere that is being projected to the 2D area of the picture. Region-wise mapping information includes the mapping of how the projection on the 2D picture is arranged. For example, for cubemap projection, the 6 faces of the cube can be arranged in different arrangements, such as 3×2 mapping (3 columns, 2 rows), 4×3 mapping (4 columns with 3 cube faces in the first column, and 3 rows with 4 cube faces in the middle row), or any other suitable mapping arrangement.

In some examples, an element can also be generated for a tile base representation that indicates the type of representation and contents of the tile base representation. For example, a SupplementalProperty element can be present to indicate that the representation is a tile base representation, and can include a value containing a list of all of the tile representations corresponding to the motion-constrained tiles encapsulated by the tile base representation. For example, the value of the SupplementalProperty element of a tile base representation can contain the list of representation identifiers (IDs) of its tile representations. In some cases, the SupplementalProperty element can be made mandatory so that the element shall be included in the MPD for a tile base representation.

FIG. 16 is a table illustrating an example of an @value of a SupplementalProperty element (or descriptor) for a tile base representation. The SupplementalProperty descriptor of the tile base representation has @schemeIdUri equal to "urn:mpeg:dash:tilebaserep:2017," indicating that the representation is a tile base representation. The @value of the SupplementalProperty, as defined in the table shown in FIG. 16, provides a whitespace-separated list of non-negative integers providing the representation IDs of the tile representations that form each complete 360-degree video picture.

Also for a tile base representation, when either of the SLPD #1 or SLPD #2 approaches described above are performed, the value @dependencyId can be set appropriately to point to its dependent representation. The dependencyId refers to the identifier (Id) of the representation that needs to be handled (e.g., decoded) before the current representation can be handled (e.g., decoded). For instance, the dependencyId for a first representation can be the Id of a second representation that is used by the first representation for inter-layer prediction. In one illustrative example, if the base layer is in representation 1 and enhancement layer is representation 2, then the representation 2 has dependency in which dependencyId is equal to 1. Note that the dependent representation (the base layer) in SLPD #1 and SLPD #2 is not a tile base representation. In some cases, it can be made mandatory that the value @dependencyId is set to point to its dependent representation.

For a tile representation, 360-degree video (or VR) specific metadata may be present. When present, the metadata is applicable to the region in a 360-degree video picture that is covered by the tile. For example, an EssentialProperty element may be present to describe information about projection types, FOV directions, region information, or other information related to the region covered by a tile. The region information can include region-wise information, most-interested region information, or other suitable information.

In some examples, an element can also be generated for a tile representation that indicates the type of representation and the position of the corresponding tile in the 360-degree video pictures. For example, a SupplementalProperty element can be present to indicate that the representation is a tile representation, and can include a value containing one or more offsets defining the position of the tile in the tile representation. For example, the value of the SupplementalProperty element of a tile representation can contain the offsets (e.g., a left and top offset) that describe the position of the tile in the complete 360-degree video pictures. In some cases, the SupplementalProperty element can be made mandatory so that the element shall be included in the MPD for a tile representation. The offsets can indicate the offset of the top-left most corner (e.g., pixel) in a tile from the top-left most corner (e.g., pixel) in an entire picture.

FIG. 17 is a table illustrating an example of an @value of a SupplementalProperty element (or descriptor) for a tile base representation. The SupplementalProperty descriptor of a tile representation has @schemeIdUri equal to "urn:mpeg:dash:tilerep:2017," indicating that the representation is a tile representation. The @value of the SupplementalProperty is a comma separated list of values specified in the table shown in FIG. 17. For example, a tile_hor_offset parameter provides a non-negative integer indicating the horizontal coordinate (e.g., in luma samples, chroma samples, or other suitable measure), of the upper left corner of the tile relative to the top left corner of the complete 360-degree video picture (or VR picture). A tile_ver_offset parameter provides a non-negative integer indicating the vertical coordinate (e.g., in luma samples, chroma samples, or other suitable measure) of the upper left corner of the tile relative to the top left corner of the complete 360-degree video picture.

When either of the SLPD #1 or SLPD #2 approaches described above are performed, and when the tile representation is not of the lowest quality (e.g., is not the base layer, which is not divided into tiles when SLPD #1 or SLPD #2 is performed), the value @dependencyId can be set appropriately to point to its dependent representation. In some cases, it can be made mandatory that the value @dependencyId is set to point to its dependent representation.

FIG. 18 is an XML code representation illustrating an example of an MPD 1800 that defines an adaptation set, a tile base representation, and multiple tile representations included in the tile base representation. The MPD 1800 is for video encoded using SLPD. For example, a VR video (also denoted as a 360-degree video) is coded using the scalable extension to the HEVC standard (SHVC) with two resolutions. The first resolution is at 1920×960 (pixels) for a base layer, and the second resolution is at 3840×1920 for an enhancement layer. The base layer is coded without tiles, whereas the enhancement layer is coded with twelve motion-constrained tiles, each tile having a resolution of 960×640.

As shown, an adaptation set is defined to include multiple representations, including the base layer representation having a representation ID equal to 1, a tile base representation having a representation ID equal to 2, and a tile representation for each of the twelve motion-constrained tiles of the pictures of the enhancement layer. A first tile representation of the tile base representation has a representation ID equal to 3, a second tile representation has a representation ID equal to 4, a third tile representation has a representation ID equal to 5, a fourth tile representation has a representation ID equal to 6, a fifth tile representation has a representation ID equal to 7, a sixth tile representation has a representation ID equal to 8, a seventh tile representation has a representation ID equal to 9, an eighth tile representation has a representation ID equal to 10, a ninth tile representation has a representation ID equal to 11, a tenth tile representation has a representation ID equal to 12, an eleventh tile representation has a representation ID equal to 13, and a twelfth tile representation has a representation ID equal to 14.

The MPD 1800 indicates that the base layer has a width of 1920 pixels, a height of 960 pixels, a frame rate of 60, among other characteristics. An EssentialProperty element 1802 is provided for the base layer. As noted above, the EssentialProperty element 1802 can describe information about projection types, FOV directions, region-wise mapping, and/or other information. For example, this information can be contained in the MPD 1800 by using EssentialProperty, in which case a different schemeIdUri can be defined for each information type. In one illustrative example, if schemeIdUri "urn:mpeg:dash:360VideoProjection:2017" is associated with projection type and "CMP" means cubemap projection, then we can define information about the cubemap projection type in the EssentialProperty element as follows: <EssentialProperty schemeIdUri="urn:mpeg:dash:360VideoProjection:2017" value="CMP"/>

An EssentialProperty element 1804 is provided for the tile base representation. The EssentialProperty element 1804 can describe information about projection types, FOV directions, region-wise mapping, and/or other information. A SupplementalProperty element 1806 is also provided for the tile base representation. As shown, the SupplementalProperty element 1806 has @schemeIdUri equal to "urn:mpeg:dash:tilebaserep:2017" to indicate to a media player (or other client device) that the representation with ID equal to 2 is a tile base representation. The @value of the SupplementalProperty element 1806 provides a whitespace-separated list of non-negative integers with the representation IDs of the tile representations that form each complete 360-degree video picture. For example, as shown, the value includes the representation IDs {3 4 5 6 7 8 9 10 11 12 13 14} corresponding to the twelve tile representations of the pictures from the enhancement layer. The dependencyId of the tile base representation is set to 1, indicating that the base layer can be used for inter-layer predicting the pictures of the enhancement layer. For example, the representation with Id="1" is the representation that contains the base layer. The representation with Id="2" is the tile base representation that covers representations with Ids 3-14. Representations with Ids 3-14 are the representations that contain the tiles of the enhancement layer. All of the representations with Ids 3-14 have dependency to the base layer, which is the representation with id="1", which is why the representations with Ids 3-14 have dependencyId="1."

An EssentialProperty element is also provided for each of the tile representations. For example, an EssentialProperty element 1808 is provided for the tile representation with representation ID equal to 3. The EssentialProperty element 1808 can describe information about projection types, FOV directions, region information, and/or other information related to the tile representation. A SupplementalProperty element 1810 is also provided for the tile representation with representation ID equal to 3. The SupplementalProperty element 1810 has @schemeIdUri equal to "urn:mpeg:dash:tilerep:2017" to indicate to the media player that the representation with ID equal to 3 is a tile representation. The other tile representations (IDs 4-14) also have the @schemeIdUri equal to "urn:mpeg:dash:tilerep:2017." The dependencyIds of each of the tile representations is set to 1, indicating that the base layer can be used for inter-layer predicting the pictures of the enhancement layer.

The @value of the SupplementalProperty element 1810 for the tile base representation with representation ID equal to 3 contains the left (or horizontal) offset and the top (or vertical) offset of the tile in the 360-degree video pictures of the enhancement layer. As shown, the left offset and the top offset for the first tile is 0, 0, indicating that the tile is the top-most and left-most tile in the picture (similar to the tile at location (0, 0) in FIG. 13). The other tile representations (IDs 4-14) also have the @value of the respective SupplementalProperty element equal to the respective offset of the tiles in the tile representations. As one example, the @value of the SupplementalProperty element for the tile base representation with representation ID equal to 4 contains a left offset equal to 960, and a top offset equal to 0, indicating that the tile is in the top row and is the second tile from the left in the picture (similar to the tile at location (0, 1) in FIG. 13). The offsets can indicate the offset of the top-left most corner (e.g., pixel) in the tile from the top-left most corner (e.g., pixel) in the entire picture.

As previously noted, most interested regions can be generated and used to enhance 360-degree video systems. In some cases, most interested regions can be determined using statistics of regions that have been requested and/or seen the most by users when certain 360-degree video content was provided through a streaming service. For instance, a most interested region in a 360-degree video picture can include one of the regions (e.g., covered by one or more tiles) that are statistically most likely to be rendered to the user at the presentation time of the picture. In some cases, a creator of the content (e.g., a director, a producer, an author, or the like) can define the most interested regions in a video.

Information on most interested regions can be signaled in an MPD (or other suitable file) using a SupplementalProperty descriptor (or element) with @schemeIdUri equal to "urn:mpeg:dash:mir:2017." In some cases, the most interested region descriptor may be present on the representation level when it is indicated that the adaptation set or the representation contains 360-degree (or VR) video data (e.g., when the adaptation set or representation has an indication of the type of 360-degree or VR projection). In some cases, the most interested region descriptor shall not be present in a representation that only contains a part of the 360-degree (or VR) video picture (such as a tile representation) instead of a complete 360-degree (or VR) video picture. In other words, when 360-degree (or VR) video pictures are encoded into multiple tiles and each tile is in one representation (i.e., a tile representation), the most interested region descriptor may be present in the tile base representation, but not in any of the tile representations.

The @value of the SupplementalProperty descriptor is a comma separated list of values specified in the table shown in FIG. 19. As shown, the @value of the SupplementalProperty descriptor includes a value for a source_id parameter, for a mir_hor_offset parameter, for a mir_ver_offset parameter, for a mir_width parameter, and for a mir_height parameter. The source_id parameter includes a non-negative integer in a decimal representation providing the identifier of the representation containing the most interested region. The mir_hor_offset parameter includes a non-negative integer indicating the horizontal coordinate (e.g., in luma samples, chroma samples, or other suitable measure) of the upper left corner of the most interested region relative to the top left corner of the complete 360-degree video picture. The mir_ver_offset parameter includes a non-negative integer indicating the vertical coordinate (e.g., in luma samples, chroma samples, or other suitable measure) of the upper left corner of the most interested region relative to the top left corner of the complete 360-degree video picture. The mir_width parameter includes a non-negative integer indicating the width of the most interested region (e.g., in pixels, in luma samples, chroma samples, or the like). The mi r height parameter includes a non-negative integer indicating the height of the most interested region (e.g., in pixels, in luma samples, chroma samples, or the like).

FIG. 20A and FIG. 20B include XML code representations illustrating an example of an MPD 2000 that defines two adaptation sets 2002 and 2004 for two different period durations. The MPD 1800 is for video encoded using SLPD. For example, a VR video (also denoted as a 360-degree video) is coded using the scalable extension to the HEVC standard (SHVC) with two resolutions. The first resolution is at 1920×960 (pixels) for a base layer, and the second resolution is at 3840×1920 for an enhancement layer. The base layer is coded without tiles, whereas the enhancement layer is coded with twelve motion-constrained tiles, each tile having a resolution of 960×640.

The VR video defined in the MPD 2000 is of 3 minutes in length and is divided into two period durations (PTOH1MO.000S and PTOH2MO.000S). In the first period, the most interested region is defined to have size of 300×300 luma pixels, and is contained within the first tile representation (with representation ID equal to 3). In the second period, the most interested region is not fully contained in one tile representation, but is contained in two tile representations (with representation IDs equal to 5 and 6).

As shown in FIG. 20A and FIG. 20B, a tile base representation is generated for each adaptation set. In other examples, multiple tile base representations can be generated for an adaptation set, as described above. Similar to the example MPD 1800 shown in FIG. 18, the MPD 2000 has multiple tile representations included in each of the tile base representation. Each tile base representation of the MPD 200 has a supplemental property element for a most interested region. Referring to FIG. 20A, a first tile base representation is defined for the first adaptation set 2002, at least in part, by the supplemental property element 2006. A supplemental property element 2008 is generated for the first tile base representation to indicate a tile in the first tile base representation that contains a most interested region for the first period duration. The supplemental property element 2008 has a @schemeIdUri equal to "urn:mpeg:dash:mir:2017" to indicate to a player device (or other device) that the element is related to a most interested region. As shown, the @value of the supplemental property element 2008 includes is a comma separated list of values—{3, 100, 100, 300, 300}. The first value is for the source_id parameter, the second value is for the mir_hor_offset parameter, the third value is for the mir_ver_offset parameter, the fourth value is for the mir_width parameter, and the fifth value is for the mir_height parameter.

The value of 3 for the source_id parameter indicates that the tile representation with Representation ID equal to 3 (with an offset of 0, 0) is the tile representation containing the most interested region. The value of 100 for the mir_hor_offset parameter indicates that the horizontal coordinate (e.g., in luma samples, chroma samples, or other suitable measure) of the upper left corner of the most interested region is 100, relative to the top left corner of the complete 360-degree video picture. The value of 100 for the mir_ver_offset parameter indicates that the vertical coordinate (e.g., in luma samples, chroma samples, or other suitable measure) of the upper left corner of the most interested region is 100, relative to the top left corner of the complete 360-degree video picture. The value of 300 for the mir_width parameter indicates that the width of the most interested region is 300 samples (e.g., in pixels, in luma samples, chroma samples, or the like), and the value of 300 for the mir_height parameter indicates that the height of the most interested region is 300 samples.

As shown in FIG. 20B, a second tile base representation is defined for the second adaptation set 2004, at least in part, by the supplemental property element 2010. Two supplemental property elements 2012 and 2014 are generated for the second tile base representation to indicate two tiles in the second tile base representation that contain a most interested region for the second period duration. In this case, the most interested region defined by in the second tile base representation is contained within two tiles. Both the supplemental property element 2012 and supplemental property element 2014 have a @schemeIdUri equal to "urn:mpeg:dash:mir:2017" to indicate to a player device (or other device) that the elements are related to a most interested region for the tile base representation.

The @value of the supplemental property element 2012 includes is a comma separated list of values—{5, 2730, 100, 150, 300}—describing the parameters of the portion of the most interested region that is in a first tile with representation ID equal to 5. The @value of the supplemental property element 2014 includes is a different comma separated list of values—{6, 2880, 100, 150, 250}—describing the parameters of the portion of the most interested region that is in a second tile with representation ID equal to 6.

The value of 5 for the source_id parameter of supplemental property element 2012 indicates that the tile representation with Representation ID equal to 5 (with an offset of 1920, 0) is the tile representation containing part of the most interested region. The value of 2730 for the mir_hor_offset parameter indicates that the horizontal coordinate (e.g., in luma samples, chroma samples, or other suitable measure) of the upper left corner of the most interested region is at 2730, relative to the top left corner of the complete 360-degree video picture. The value of 100 for the mir_ver_offset parameter indicates that the vertical coordinate (e.g., in luma samples, chroma samples, or other suitable measure) of the upper left corner of the most interested region is 100, relative to the top left corner of the complete 360-degree video picture. The value of 150 for the mir_width parameter indicates that the width of the portion of the most interested region that is within the tile with tile representation ID=5 is 150 samples (e.g., in pixels, in luma samples, chroma samples, or the like), and the value of 300 for the mir_height parameter indicates that the height of the portion of the most interested region that is within the tile with tile representation ID=5 is 300 samples.

The value of 6 for the source_id parameter of the supplemental property element 2014 indicates that the tile representation with Representation ID equal to 6 (with an offset of 1920, 0) is the other tile representation from the second tile base representation containing part of the most interested region. The value of 2880 for the mir_hor_offset parameter indicates that the horizontal coordinate (e.g., in luma samples, chroma samples, or other suitable measure) of the upper left corner of the most interested region is at 2880, relative to the top left corner of the complete 360-degree video picture. It is noted here that the horizontal coordinate of the upper left corner of the portion of the most interested region defined by the supplemental property element 2014 is the same as the horizontal offset of the upper left corner of the tile (in the tile representation with ID=6), which indicates that the most interested region crosses over the top-left corner of the tile in the tile representation with ID=6 and into the tile in the tile representation with ID=5.

The value of 100 for the mir_ver_offset parameter of the supplemental property element 2014 indicates that the vertical coordinate (e.g., in luma samples, chroma samples, or other suitable measure) of the upper left corner of the most interested region is 100, relative to the top left corner of the complete 360-degree video picture. The value of 150 for the mir_width parameter indicates that the width of the portion of the most interested region that is within the tile with tile representation ID=6 is 150 samples (e.g., in pixels, in luma samples, chroma samples, or the like), and the value of 250 for the mir_height parameter indicates that the height of the portion of the most interested region that is within the tile with tile representation ID=6 is 250 samples.

FIG. 21 is a flowchart illustrating an example of a process 2100 of processing video data using one or more of the techniques described herein. At block 2102, the process 2100 includes obtaining 360-degree video data. The 360-degree video data includes a plurality of pictures divided into a plurality of motion-constrained tiles. In some cases, the 360-degree video data includes a plurality of layers of pictures, the plurality of layers of pictures including at least one or more of different resolutions, different qualities, or different frame rates. For example, the 360-degree video data can include pictures of at least one enhancement layer that are divided into motion-constrained tiles, and also pictures of a base layer that are not divided into motion-constrained tiles. In another example, the 360-degree video data can include pictures of at least one enhancement layer that are divided into motion-constrained tiles, and also pictures of a base layer that are divided into motion-constrained tiles.

At block 2104, the process 2100 includes generating, using the 360-degree video data, a media file including a plurality of tracks. Each of the plurality of tracks contain a set of at least one of the plurality of motion-constrained tiles. The set of at least one of the plurality of motion-constrained tiles corresponds to at least one of a plurality of viewports of the 360-degree video data. In some examples, the media file includes a manifest file associated with an adaptive streaming format. For example, the media file can include a media presentation description (MPD). In another example, the media file can include an HLS playlist file, or any other suitable manifest file associated with an adaptive streaming format.

At block 2106, the process 2100 includes generating a first tile representation for the media file. The first tile representation encapsulates a first track of the plurality of tracks. In some cases, the first tile representation includes a Dynamic Adaptive Streaming over HTTP (DASH) representation. The first track includes a first set of at least one of the plurality of motion-constrained tiles at a first tile location in the plurality of pictures of the 360-degree video data. For example, the plurality of motion-constrained tiles can be at location (3, 0) shown in FIG. 13. The first set of at least one of the plurality of motion-constrained tiles corresponds to a viewport of the 360-degree video data. For example, the first set of the at least one of the plurality of motion-constrained tiles at the first tile location can be provided to a player device for rendering a portion of the viewport or the entire viewport. In some cases, multiple tiles at different tile locations in the pictures can be provided to the player device for rendering the viewport, such as when a viewport is covered by multiple tile locations.

In some examples, the process 2100 includes generating an adaptation set for the media file. The adaptation set includes a plurality of tile representations of the 360-degree video data corresponding to different viewports. In some cases, the plurality of tile representations correspond to the different viewports and to different resolutions, different qualities, or different frames rates, or any suitable combination thereof, that correspond to the layer the tile representations are part of. An example of an adaptation set is shown in FIG. 15. In some cases, the plurality of tile representations include the plurality of motion-constrained tiles, and the plurality of pictures divided into the plurality of motion-constrained tiles are part of at least one enhancement layer. In such cases, the plurality of tile representations further include a plurality of pictures of a base layer. As noted above, in some examples, the plurality of pictures of the base layer do not include motion-constrained tiles. In other examples, the plurality of pictures of the base layer include motion-constrained tiles.

In some examples, the process 2100 includes generating an adaptation set. As noted above, the adaptation set includes a set of tile representations corresponding to different viewports. In such examples, the process 2100 also includes generating, for at least one layer (with different layers having different resolutions, qualities, and/or different frames rates), a tile base representation. The tile base representation encapsulates all motion-constrained tiles of pictures in at least one layer. For example, a tile base representation can be generated for each layer (corresponding to a specific resolution, quality, frame rate, or combination thereof) of the bitstream that has tile-based coded pictures. An example of an adaptation set with a tile base representation is shown in FIG. 15. In some cases, the tile base representation includes a DASH representation.

In some examples, metadata is defined for the tile base representation and is applicable to the plurality of pictures from the 360-degree video data that are divided into the plurality of motion-constrained tiles. The metadata can include information associated with at least one or more of a video projection type, one or more viewport directions, region-wise mapping of the pictures, or any combination thereof. In some cases, a supplemental property element is defined for the tile base representation. The supplemental property element indicates that the tile base representation is a tile base representation. For example, as noted above, the supplemental property element of a tile base representation can have a @schemeIdUri equal to "urn:mpeg:dash:tile-baserep:2017" to indicate that the representation is a tile base representation. In some cases, a value of the supplemental property element includes a list of a plurality of tile representation identifiers identifying a plurality of tile representations of the tile base representation. As noted above, the tile representations of a tile base representation include the tile representations of all tiles within a complete video picture.

In some examples, metadata is defined for the first tile representation. The metadata is applicable to a region in a picture of the 360-degree video data that is covered by a motion-constrained tile (encapsulated by the first tile representation) at the first tile location in the pictures of the 360-degree video data. The metadata can include information associated with at least one or more of a video projection type, one or more viewport directions, region information of the first tile representation, or any combination thereof. In some cases, a supplemental property element is defined for the first tile representation. The supplemental property element indicates that the first tile representation is a tile representation. For example, as noted above, the supplemental property element of a tile representation can have a @schemeIdUri equal to "urn:mpeg:dash:tilerep:2017" to indicate that the representation is a tile representation. In some cases, a value of the supplemental property element includes one or more offsets describing a position of the motion-constrained tile in the picture. The one or more offsets can include a left offset and a top offset, or any other suitable offsets to indicate where the tile is relative to an entire picture.

In some examples, the process 2100 includes generating a descriptor indicating one or more most interested regions in the 360-degree video data. In some cases, the descriptor is generated on a tile base representation level, in which case a tile base representation encapsulates all motion-constrained tiles of pictures of at least one layer, as described above. The descriptor can include an identifier of a tile representation containing a most interested region in the 360-degree video data. Using FIG. 20A as an example, the supplemental property element 2008 includes a value of 3 for a source_id parameter, indicating that the tile representation with Representation ID equal to 3 is the tile representation containing the most interested region. The descriptor can also include one or more offsets indicating a location of the most interested region in a picture of the 360-degree video data. For example, the supplemental property element 2008 includes value of 100 for the mir_hor_offset parameter, which indicates that the horizontal coordinate of the upper left corner of the most interested region is 100, relative to the top left corner of the complete 360-degree video picture. The supplemental property element 2008 also includes a value of 100 for the mir_ver_offset parameter, indicating that the vertical coordinate of the upper left corner of the most interested region is 100. The descriptor can also include a width parameter indicating a width of the most interested region and a height parameter indicating a height of the most interested region. Referring again to FIG. 20A, the supplemental property element 2008 includes a value of 300 for the mir_width parameter, indicating that the width of the most interested region is 300 samples (e.g., in pixels, in luma samples, chroma samples, or the like), and a value of 300 for the mir_height parameter, which indicates that the height of the most interested region is 300 samples.

FIG. 22 is a flowchart illustrating an example of a process 2200 of processing one or more video files using one or more of the techniques described herein. At block 2202, the process 2200 includes obtaining a media file including a plurality of tracks. each of the plurality of tracks contains a set of at least one of a plurality of motion-constrained tiles of a plurality of pictures representing 360-degree video data. The set of at least one of the plurality of motion-constrained tiles corresponds to at least one of a plurality of viewports of the 360-degree video data.

At block 2204, the process 2200 includes processing the media file. The media file includes a first tile representation for the media file. In some examples, the media file includes a manifest file associated with an adaptive streaming format. For example, the media file can include a media presentation description (MPD). In another example, the media file can include an HLS playlist file, or any other suitable manifest file associated with an adaptive streaming format. The first tile representation encapsulates a first track of the plurality of tracks. In some cases, the first tile representation includes a Dynamic Adaptive Streaming over HTTP (DASH) representation. The first track includes a first set of at least one of the plurality of motion-constrained tiles at a first tile location in the plurality of pictures of the 360-degree video data. For example, the first set of the at least one of the plurality of motion-constrained tiles can be at location (3, 2) shown in FIG. 13. The first set of at least one of the plurality of motion-constrained tiles corresponds to a viewport of the 360-degree video data. For example, the first set of the at least one of the plurality of motion-constrained tiles at the first tile location can be used to render a portion of the viewport or the entire viewport. In some cases, multiple tiles at different tile locations in the pictures need to be used for rendering the viewport.

In some examples, the media file includes an adaptation set. The adaptation set includes a plurality of tile representations of the 360-degree video data corresponding to different viewports. In some cases, the plurality of tile representations correspond to the different viewports and to different resolutions, different qualities, or different frames rates, or any suitable combination thereof, that correspond to the layer the tile representations are part of. An example of an adaptation set is shown in FIG. 15. In some cases, the plurality of tile representations include the plurality of motion-constrained tiles, and the plurality of pictures divided into the plurality of motion-constrained tiles are part of at least one enhancement layer. In such cases, the plurality of tile representations further include a plurality of pictures of a base layer. In some examples, the plurality of pictures of the base layer do not include motion-constrained tiles. In other examples, the plurality of pictures of the base layer include motion-constrained tiles.

In some examples, the media file includes an adaptation set including a set of tile representations corresponding to different viewports. In such examples, for at least one layer (with different layers having different resolutions, qualities, and/or different frames rates), the media file includes a tile base representation encapsulating all motion-constrained tiles of pictures in the at least one layer. For example, a tile base representation can be generated for each layer (corresponding to a specific resolution, quality, frame rate, or combination thereof) of the bitstream that has tile-based coded pictures. An example of an adaptation set with a tile base representation is shown in FIG. 15. In some cases, the tile base representation includes a DASH representation.

In some examples, metadata is defined for the tile base representation and is applicable to the plurality of pictures from the 360-degree video data that are divided into the plurality of motion-constrained tiles. The metadata can include information associated with at least one or more of a video projection type, one or more viewport directions, region-wise mapping of the pictures, or any combination thereof. In some cases, a supplemental property element is defined for the tile base representation. The supplemental property element indicates that the tile base representation is a tile base representation. For example, as noted above, the supplemental property element of a tile base representation can have a @schemeIdUri equal to "urn:mpeg:dash:tile-baserep:2017" to indicate that the representation is a tile base representation. In some cases, a value of the supplemental property element includes a list of a plurality of tile representation identifiers identifying a plurality of tile representations of the tile base representation. As noted above, the tile representations of a tile base representation include the tile representations of all tiles within a complete video picture.

In some examples, metadata is defined for the first tile representation. The metadata is applicable to a region in a picture of the 360-degree video data that is covered by a motion-constrained tile (encapsulated by the first tile representation) at the first tile location in the pictures of the 360-degree video data. The metadata can include information associated with at least one or more of a video projection type, one or more viewport directions, region information of the first tile representation, or any combination thereof. In some cases, a supplemental property element is defined for the first tile representation. The supplemental property element indicates that the first tile representation is a tile representation. For example, as noted above, the supplemental property element of a tile representation can have a @schemeIdUri equal to "urn:mpeg:dash:tilerep:2017" to indicate that the representation is a tile representation. In some cases, a value of the supplemental property element includes one or more offsets describing a position of the motion-constrained tile in the picture. The one or more offsets can include a left offset and a top offset, or any other suitable offsets to indicate where the tile is relative to an entire picture.

In some examples, the media file includes a descriptor indicating one or more most interested regions in the 360-degree video data. In some cases, the descriptor is generated on a tile base representation level, in which case a tile base representation encapsulates all motion-constrained tiles of pictures of at least one layer, as described above. The descriptor can include an identifier of a tile representation containing a most interested region in the 360-degree video data. Using FIG. 20B as an example, the supplemental property element 2012 includes a value of 5 for a source_id parameter, indicating that the tile representation with Representation ID equal to 5 is the tile representation containing a part of the most interested region. The descriptor can also include one or more offsets indicating a location of the most interested region in a picture of the 360-degree video data. For example, the supplemental property element 2012 includes value of 2730 for the mir_hor_offset parameter, which indicates that the horizontal coordinate of the upper left corner of the most interested region is 2730, relative to the top left corner of the complete 360-degree video picture. The supplemental property element 2012 also includes a value of 100 for the mir_ver_offset parameter, indicating that the vertical coordinate of the upper left corner of the most interested region is 100. The descriptor can also include a width parameter indicating a width of the most interested region and a height parameter indicating a height of the most interested region. Referring again to FIG. 20B, the supplemental property element 2012 includes a value of 150 for the mir_width parameter, indicating that the width of the most interested region is 150 samples, and a value of 300 for the mir_height parameter, which indicates that the height of the most interested region is 300 samples.

In some examples, the processes 2100 and 2200 may be performed by a computing device or an apparatus, such as the system 100 shown in FIG. 1. In some examples, processes 2100 and 2200 can be performed by a file generation device, a file parsing or processing device, the encoding device 104 shown in FIG. 1 and FIG. 23, by another video transmission-side device or video transmission device, by the decoding device 112 shown in FIG. 1 and FIG. 24, and/or by another client-side device, such as a player device, a display, or any other client-side device. In one example, the process 2100 can be performed by a file generation device, the encoding device 104 shown in FIG. 1 and FIG. 23, and/or by another transmission-side device or video transmission device. In another example, the process 2200 can be performed by a file parsing or processing device, the decoding device 112 shown in FIG. 1 and FIG. 24, and/or by another client-side device, such as a player device, a display, or any other client-side device. In some cases, the computing device or apparatus may include a processor, microprocessor, microcomputer, or other component of a device that is configured to carry out the steps of processes 1600, 1700, and 1800. In some examples, the computing device or apparatus may include a camera configured to capture video data (e.g., a video sequence) including video frames. In some examples, a camera or other capture device that captures the video data is separate from the computing device, in which case the computing device receives or obtains the captured video data. The computing device may further include a network interface configured to communicate the video data. The network interface may be configured to communicate Internet Protocol (IP) based data or other type of data. In some examples, the computing device or apparatus may include a display for displaying output video content, such as samples of pictures of a video bitstream.

Processes 2100 and 2200 are illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types.

The order in which the operations are described is not intended to be construed as a limitation, and any number of the described operations can be combined in any order and/or in parallel to implement the processes.

Additionally, the processes 2100 and 2200 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the invention have been described.

Figure 23:
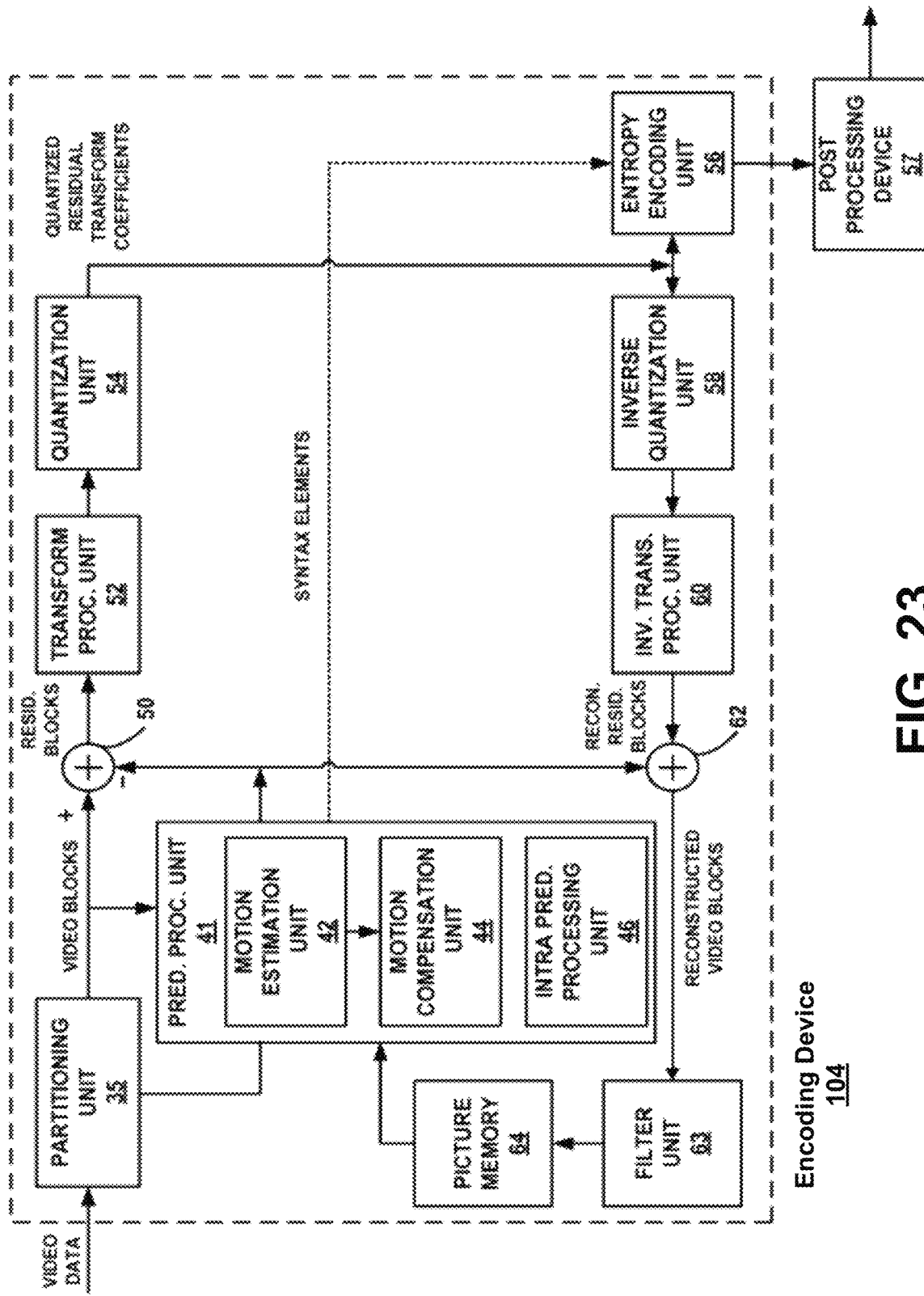
FIG. 23 is a block diagram illustrating an example video encoding device, in accordance with some examples.
Figure 24:
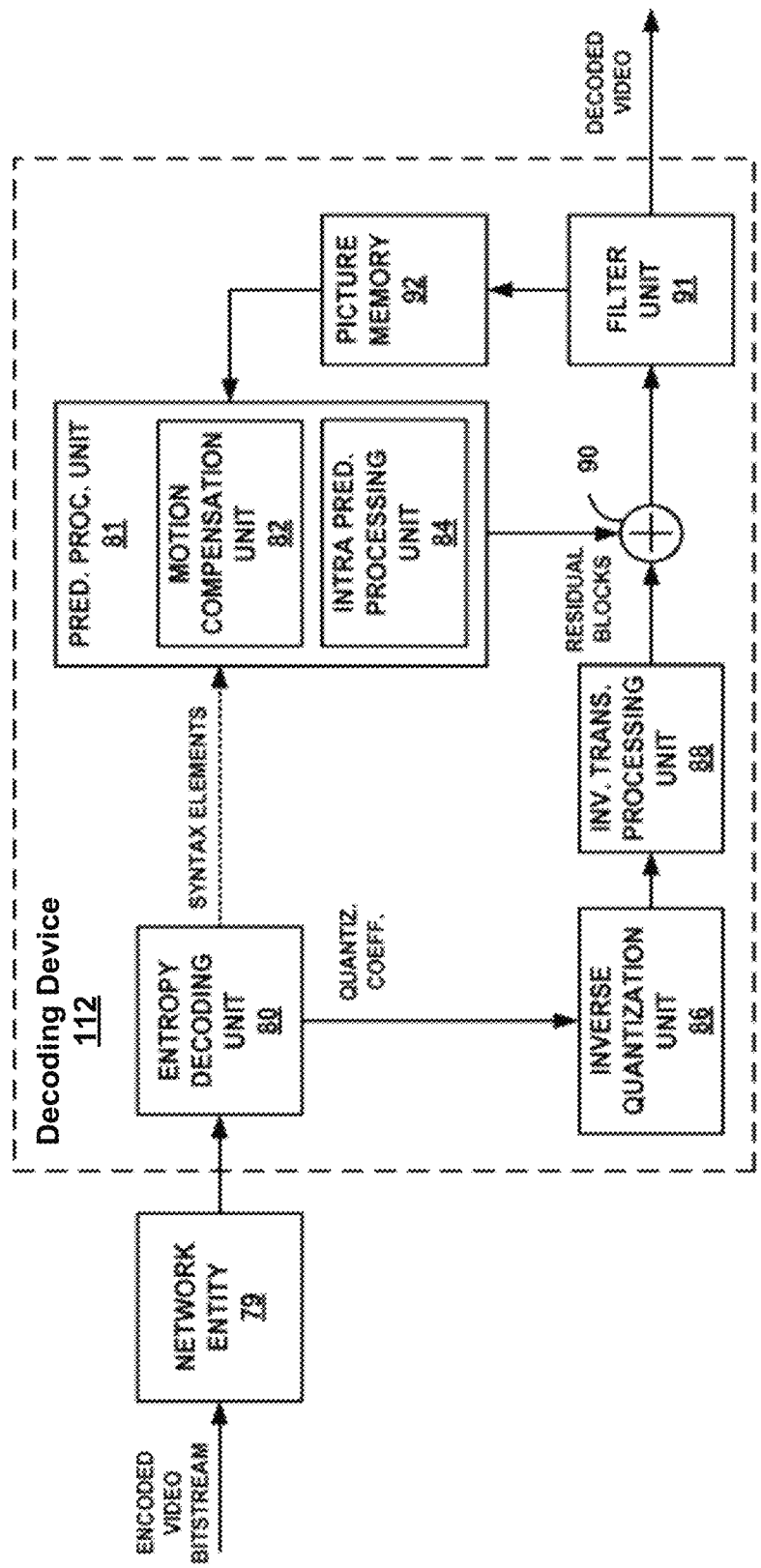
FIG. 24 is a block diagram illustrating an example video decoding device, in accordance with some examples.

Specific details of the encoding device 104 and the decoding device 112 are shown in FIG. 23 and FIG. 24, respectively. FIG. 23 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 23 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 23, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64.

Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction unit processing 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bitrate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 23 represents an example of a video encoder configured to derive LIC parameters, adaptively determine sizes of templates, and/or adaptively select weights. The encoding device 104 may, for example, derive LIC parameters, adaptively determine sizes of templates, and/or adaptively select weights sets as described above. For instance, the encoding device 104 may perform any of the techniques described herein, including the processes described above with respect to FIG. 21 and FIG. 22. In some cases, some of the techniques of this disclosure may also be implemented by post processing device 57.

FIG. 24 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 23.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 17 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In this manner, the decoding device 112 of FIG. 24 represents an example of a video decoder configured to derive LIC parameters, adaptively determine sizes of templates, and/or adaptively select weights. The decoding device 112 may, for example, derive LIC parameters, adaptively determine sizes of templates, and/or adaptively select weights sets as described above. For instance, the decoding device 112 may perform any of the techniques described herein, including the processes described above with respect to FIG. 21 and FIG. 22.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of processing video data, the method comprising:
   obtaining 360-degree video data, the 360-degree video data including a plurality of pictures divided into a plurality of motion-constrained tiles;
   generating, using the 360-degree video data, a media file including a plurality of tracks, each of the plurality of tracks containing a corresponding set of the plurality of motion-constrained tiles, wherein each set of the plurality of motion-constrained tiles corresponds to a corresponding viewport of a plurality of viewports of the 360-degree video data;
   generating, for the media file, an adaptation set including a set of tile representations corresponding to the plurality of viewports, the set of tile representations including a first tile representation encapsulating a first track of the plurality of tracks, the first track including a plurality of tiles at a first tile location in the plurality of pictures, wherein the plurality of tiles at the first tile location in the plurality of pictures are included in the first tile representation, and correspond to a viewport of the 360-degree video data;
   generating, for the adaptation set, a first tile base representation encapsulating tile representations associated with a first version of the 360-degree video data and a second tile base representation encapsulating tile representations associated with a second version of the 360-degree video data; and
   generating first 360-degree video specific metadata for the first tile base representation and second 360-degree video specific metadata for the second tile base representation, the first 360-degree video specific metadata including information related to the viewport of the 360-degree video data corresponding to the plurality of tiles.

2. The method of claim 1, wherein the first tile representation includes a Dynamic Adaptive Streaming over HTTP (DASH) representation.

3. The method of claim 1, wherein the media file includes a manifest file associated with an adaptive streaming format.

4. The method of claim 1, wherein the media file includes a media presentation description (MPD).

5. The method of claim 1, wherein the set of tile representations include the plurality of motion-constrained tiles, wherein the plurality of pictures divided into the plurality of motion-constrained tiles are part of at least one enhancement layer, and wherein the set of tile representations further include a plurality of pictures of a base layer.

6. The method of claim 5, wherein the plurality of pictures of the base layer do not include motion-constrained tiles.

7. The method of claim 5, wherein the plurality of pictures of the base layer include motion-constrained tiles.

8. The method of claim 1, wherein the first tile base representation encapsulates all motion-constrained tiles of pictures in the first version of the 360-degree video data, and wherein the second tile base representation encapsulates all motion-constrained tiles of pictures in the second version of the 360-degree video data.

9. The method of claim 1, wherein the first tile base representation includes a first DASH representation, and wherein the second tile base representation includes a second DASH representation.

10. The method of claim 1, wherein the first 360-degree video specific metadata includes information associated with at least one or more of a video projection type, one or more viewport directions, or region-wise mapping of one or more pictures of the first version of the 360-degree video data.

11. The method of claim 1, wherein the first 360-degree video specific metadata is defined for the first tile representation and is applicable to a region in a picture of the 360-degree video data that is covered by a motion-constrained tile at the first tile location in the plurality of pictures of the 360-degree video data, the first 360-degree video specific metadata including information associated with at least one or more of a video projection type, one or more viewport directions, or region information of the first tile representation.

12. The method of claim 1, further comprising generating a descriptor indicating one or more most interested regions in the 360-degree video data.

13. The method of claim 12, wherein the descriptor is generated on a tile base representation level, wherein a tile base representation encapsulates all motion-constrained tiles of pictures in at least one layer.

14. An apparatus for processing video data, comprising:
a memory configured to store 360-degree video data; and
a processor configured to:
obtain the 360-degree video data, the 360-degree video data including a plurality of pictures divided into a plurality of motion-constrained tiles;
generate, using the 360-degree video data, a media file including a plurality of tracks, each of the plurality of tracks containing a corresponding set of the plurality of motion-constrained tiles, wherein each set of the plurality of motion-constrained tiles corresponds to a corresponding viewport of a plurality of viewports of the 360-degree video data;
generate an adaptation set including a set of tile representations corresponding to the plurality of viewports, the set of tile representations including a first tile representation encapsulating a first track of the plurality of tracks, the first track including a plurality of tiles at a first tile location in the plurality of pictures, wherein the plurality of tiles at the first tile location in the plurality of pictures are included in the first tile representation and correspond to a viewport of the 360-degree video data;
generate, for the adaptation set, a first tile base representation encapsulating tile representations associated with a first version of the 360-degree video data and a second tile base representation encapsulating tile representations associated with a second version of the 360-degree video data; and
generate first 360-degree video specific metadata for the first tile base representation and second 360-degree video specific metadata for the second tile base representation, the first 360-degree video specific metadata including information related to the viewport of the 360-degree video data corresponding to the plurality of tiles.

15. The apparatus of claim 14, wherein the first tile representation includes a Dynamic Adaptive Streaming over HTTP (DASH) representation.

16. The apparatus of claim 14, wherein the media file includes a manifest file associated with an adaptive streaming format.

17. The apparatus of claim 14, wherein the media file includes a media presentation description (MPD).

18. The apparatus of claim 14, wherein the set of tile representations include the plurality of motion-constrained tiles, wherein the plurality of pictures divided into the plurality of motion-constrained tiles are part of at least one enhancement layer, and wherein the set of tile representations further include a plurality of pictures of a base layer.

19. The apparatus of claim 18, wherein the plurality of pictures of the base layer do not include motion-constrained tiles.

20. The apparatus of claim 18, wherein the plurality of pictures of the base layer include motion-constrained tiles.

21. The apparatus of claim 14, wherein the first tile base representation encapsulates all motion-constrained tiles of pictures in the first version of the 360-degree video data, and wherein the second tile base representation encapsulates all motion-constrained tiles of pictures in the second version of the 360-degree video data.

22. The apparatus of claim 14, wherein the first tile base representation includes a first DASH representation, and wherein the second tile base representation includes a second DASH representation.

23. The apparatus of claim 14, wherein the first 360-degree video specific metadata includes information associated with at least one or more of a video projection type, one or more viewport directions, or region-wise mapping of one or more pictures of the first version of the 360-degree video data.

24. The apparatus of claim 14, wherein the first 360-degree video specific metadata is defined for the first tile representation and is applicable to a region in a picture of the 360-degree video data that is covered by a motion-constrained tile at the first tile location in the plurality of pictures of the 360-degree video data, the first 360-degree video specific metadata including information associated with at least one or more of a video projection type, one or more viewport directions, or region information of the first tile representation.

25. The apparatus of claim 14, wherein the processor is further configured to generate a descriptor indicating one or more most interested regions in the 360-degree video data.

26. The apparatus of claim 25, wherein the descriptor is generated on a tile base representation level, wherein a tile base representation encapsulates all motion-constrained tiles of pictures in at least one layer.

27. The apparatus of claim 14, wherein the apparatus comprises a mobile device with a camera for capturing pictures.

28. A method of processing one or more media files, comprising:
obtaining a media file including a plurality of tracks, each of the plurality of tracks containing a corresponding set of a plurality of motion-constrained tiles of a plurality of pictures representing 360-degree video data, wherein each set of the plurality of motion-constrained tiles corresponds to a corresponding viewport of a plurality of viewports of the 360-degree video data, wherein the media file further includes an adaptation set including a set of tile representations corresponding to the plurality of viewports, the set of tile representations including a first tile representation encapsulating a first track of the plurality of tracks, the first track including a plurality of tiles at a first tile location in the plurality of pictures, wherein the plurality of tiles at the first tile location in the plurality of pictures are included in the first tile representation, and correspond to a viewport of the 360-degree video data;

obtaining, from the adaptation set, a first tile base representation encapsulating tile representations associated with a first version of the 360-degree video data and a second tile base representation encapsulating tile representations associated with a second version of the 360-degree video data;

obtaining first 360-degree video specific metadata for the the first tile base representation and second 360-degree video specific metadata for the second tile base representation, the first 360-degree video specific metadata including information related to the viewport of the 360-degree video data corresponding to the plurality of tiles; and processing the media file based on at least one of the first 360-degree video specific metadata or the second 360-degree video specific metadata.

29. The method of claim 28, wherein the first tile representation includes a Dynamic Adaptive Streaming over HTTP (DASH) representation.

30. The method of claim 28, wherein the media file includes a manifest file associated with an adaptive streaming format.

31. The method of claim 28, wherein the media file includes a media presentation description (MPD).

32. The method of claim 28, wherein the set of tile representations include the plurality of motion-constrained tiles, wherein the plurality of pictures divided into the plurality of motion-constrained tiles are part of at least one enhancement layer, and wherein the set of tile representations further include a plurality of pictures of a base layer.

33. The method of claim 32, wherein the plurality of pictures of the base layer do not include motion-constrained tiles.

34. The method of claim 32, wherein the plurality of pictures of the base layer include motion-constrained tiles.

35. The method of claim 28, wherein the first tile base representation encapsulates all motion-constrained tiles of pictures in the first version of the 360-degree video data, and wherein the second tile base representation encapsulates all motion-constrained tiles of pictures in the second version of the 360-degree video data.

36. The method of claim 28, wherein the first tile base representation includes a first DASH representation, and wherein the second tile base representation includes a second DASH representation.

37. The method of claim 28, wherein the first 360-degree video specific metadata includes information associated with at least one or more of a video projection type, one or more viewport directions, or region-wise mapping of one or more pictures of the first version of the 360-degree video data.

38. The method of claim 28, wherein the first 360-degree video specific metadata is defined for the first tile representation and is applicable to a region in a picture of the 360-degree video data that is covered by a motion-constrained tile at the first tile location in the plurality of pictures of the 360-degree video data, the first 360-degree video specific metadata including information associated with at least one or more of a video projection type, one or more viewport directions, or region information of the first tile representation.

39. The method of claim 28, wherein the media file includes a descriptor indicating one or more most interested regions in the 360-degree video data.

40. The method of claim 39, wherein the descriptor is generated on a tile base representation level, wherein a tile base representation encapsulates all motion-constrained tiles of pictures in at least one layer.

41. An apparatus for processing one or more media files, comprising:
a memory configured to store the one or more media files comprising 360-degree video data; and
a processor configured to:
obtain a media file including a plurality of tracks, each of the plurality of tracks containing a corresponding set of a plurality of motion-constrained tiles of a plurality of pictures representing 360-degree video data, wherein each set of the plurality of motion-constrained tiles corresponds to a corresponding viewport of a plurality of viewports of the 360-degree video data, wherein the media file further includes an adaptation set including a set of tile representations corresponding to the plurality of viewports, the set of tile representations including a first tile representation encapsulating a first track of the plurality of tracks, the first track including a plurality of tiles at a first tile location in the plurality of pictures, wherein the plurality of tiles at the first tile location in the plurality of pictures are included in the first tile representation, and correspond to a viewport of the 360-degree video data;

obtain, from the adaptation set, a first tile base representation encapsulating tile representations associated with a first version of the 360-degree video data and a second tile base representation encapsulating tile representations associated with a second version of the 360-degree video data;

obtain first 360-degree video specific metadata for the the first tile base representation and second 360-degree video specific metadata for the second tile base representation, the first 360-degree video specific metadata including information related to the viewport of the 360-degree video data corresponding to the first set plurality of tiles; and process the media file based at least one of the first 360-degree video specific metadata or the second 360-degree video specific metadata.

42. The apparatus of claim 41, wherein the first tile representation includes a Dynamic Adaptive Streaming over HTTP (DASH) representation.

43. The apparatus of claim 41, wherein the media file includes a manifest file associated with an adaptive streaming format.

44. The apparatus of claim 41, wherein the media file includes a media presentation description (MPD).

45. The apparatus of claim 41, wherein the set of tile representations include the plurality of motion-constrained tiles, wherein the plurality of pictures divided into the plurality of motion-constrained tiles are part of at least one enhancement layer, and wherein the set of tile representations further include a plurality of pictures of a base layer.

46. The apparatus of claim 45, wherein the plurality of pictures of the base layer do not include motion-constrained tiles.

47. The apparatus of claim 45, wherein the plurality of pictures of the base layer include motion-constrained tiles.

48. The apparatus of claim 41, wherein the first tile base representation encapsulates all motion-constrained tiles of pictures in the first version of the 360-degree video data, and wherein the second tile base representation encapsulates all motion-constrained tiles of pictures in the second version of the 360-degree video data.

49. The apparatus of claim 41, wherein first tile base representation includes a first DASH representation, and wherein the second tile base representation includes a second DASH representation.

50. The apparatus of claim 41, wherein the first 360-degree video specific metadata includes information associated with at least one or more of a video projection type, one or more viewport directions, or region-wise mapping of one or more pictures of the first version of the 360-degree video data.

51. The apparatus of claim 41, wherein the first 360-degree video specific metadata is defined for the first tile representation and is applicable to a region in a picture of the 360-degree video data that is covered by a motion-constrained tile at the first tile location in the plurality of pictures of the 360-degree video data, the first 360-degree video specific metadata including information associated with at least one or more of a video projection type, one or more viewport directions, or region information of the first tile representation.

52. The apparatus of claim 41, wherein the media file includes a descriptor indicating one or more most interested regions in the 360-degree video data.

53. The apparatus of claim 52, wherein the descriptor is generated on a tile base representation level, wherein a tile base representation encapsulates all motion-constrained tiles of pictures in at least one layer.

54. The apparatus of claim 41, further comprising: a display for displaying the video data.

55. The apparatus of claim 41, wherein the apparatus comprises a mobile device with a camera for capturing pictures.

* * * * *